(12) United States Patent
Muramatsu et al.

(10) Patent No.: US 6,403,872 B2
(45) Date of Patent: Jun. 11, 2002

(54) KEYBOARD MUSICAL INSTRUMENT FAITHFULLY REPRODUCING ORIGINAL PERFORMANCE WITHOUT COMPLICATED TUNING AND MUSIC DATA GENERATING SYSTEM INCORPORATED THEREIN

(75) Inventors: Shigeru Muramatsu; Yasuhiko Oba; Tadaharu Kato; Kiyoshi Kawamura, all of Shizuoka (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/737,615

(22) Filed: Dec. 13, 2000

(30) Foreign Application Priority Data

Dec. 16, 1999 (JP) .......................................... 11-357757

(51) Int. Cl.⁷ .................................................. G10H 3/06

(52) U.S. Cl. ........................................... 84/724; 84/21

(58) Field of Search ................................. 84/724, 19–21

(56) References Cited

U.S. PATENT DOCUMENTS

| | | | | |
|---|---|---|---|---|
| 4,736,662 A | * | 4/1988 | Yamamoto | |
| 4,913,026 A | * | 4/1990 | Kaneko et al. | 84/21 |
| 5,194,685 A | | 3/1993 | Kawamura et al. | |
| 5,237,123 A | | 8/1993 | Miller | |
| 5,880,389 A | * | 3/1999 | Muramatsu | 84/21 X |
| 5,880,393 A | * | 3/1999 | Kaneko et al. | 84/21 X |

* cited by examiner

Primary Examiner—Jeffrey Donels
(74) Attorney, Agent, or Firm—Morrison & Foerster LLP

(57) ABSTRACT

An automatic player piano is an acoustic piano equipped with a data acquisition system and a playback system, and the data acquisition system monitors the hammers with hammer sensors for producing a set of music data codes representative of a performance on the keyboard, wherein the hammer sensor has a detectable range over the trajectory of the associated hammer so that the data acquisition system obtains pieces of music data accurately representative of the trajectory of hammer to be required for a faithful reproduction of the original performance.

34 Claims, 19 Drawing Sheets

KEYBOARD MUSICAL INSTRUMENT FAITHFULLY REPRODUCING ORIGINAL PERFORMANCE WITHOUT COMPLICATED TUNING AND MUSIC DATA GENERATING SYSTEM INCORPORATED THEREIN

FIELD OF THE INVENTION

This invention relates to a keyboard musical instrument and, more particularly, to a keyboard musical instrument equipped with an information processing system and a data acquisition system for generating music data information representative of a performance on the keyboard musical instrument.

DESCRIPTION OF THE RELATED ART

An automatic player piano is categorized in the keyboard musical instrument. The automatic player piano is based on an acoustic piano, and an automatic playing system and a data acquisition system are assembled with the acoustic piano. While a pianist is playing a tune on the acoustic piano, the data acquisition system monitors the keys to see whether or not the pianist depresses any one of the keys. When the data acquisition system notices a key moving from the rest position toward the end position, the data acquisition system specifies the key and the key velocity, and generates a piece of music data information representative of the key motion. The data acquisition system successively generates pieces of music data information during the performance. The pieces of music data information are stored in a suitable memory for playback. Otherwise, the data acquisition system formats the pieces of music data information into music data codes, and supplies the music data codes to another musical instrument such as, for example, an electric keyboard for producing the electronic sounds.

The prior art data acquisition system has an array of key sensors, which are assigned to the keys of the keyboard, respectively. The key sensor is broken down into a pair of photo couplers and a shutter plate. The shutter plate is attached to the lower surface of the associated key, and downwardly projects therefrom. The photo couplers are provided under the associated key, and are arranged along the trajectory of the shutter plate. When the key is depressed, the shutter plate is downwardly moved together with the key, and sequentially interrupts the light beams of the photo couplers. The detecting signals are sequentially supplied from the photo couplers to a data processing unit. The data processing unit specifies the depressed keys and determines the key velocity on the basis of the time period between the interruption at the first photo coupler and the interruption at the next photo coupler. The key velocity determines the loudness of the sound to be proportional thereto. The data processing unit further estimates a time to strike the associated music string with the hammer on the basis of the key velocity and the time to be interrupted by the shutter plate.

If the player simply depresses all the keys from the rest positions to the end positions, the prior art data acquisition system will generate a set of music data codes exactly representing the original performance. However, such fingering is rare. A pianist repeats the depression without reaching the rest position. The times to strike the music string are different from those stored in the music data codes, and the loudness of the actual sound is deviated from the loudness stored in the music data code. For example, a player is assumed to insert a repetition in his performance. The keystroke is short, and the actual piano sound is weak. However, the key velocity is large, and the large loudness is stored in the music data code. If the automatic player reproduces the sound on the basis of the music data code, the hammer violently strikes the music string, and makes the reproduced sound different from the original sound.

A countermeasure has been proposed. In order to exactly determine the loudness of the actual sound, hammer sensors are attached to the acoustic piano. FIG. 1 shows the prior art hammer sensors 70 associated with one of the hammers. In the following description, term "front" is indicative of a position closer to a player sitting for playing a tune on the keyboard, and, accordingly, term "rear" is indicative of a position farther from the player than the front position. Term "lateral" is indicative of a direction in which the keys are arranged on a key bed.

The hammer is broken down into a hammer shank 43 and a hammer head 44. The hammer shank 43 upwardly projects from a hammer butt 41, and the hammer head 44 is fixed to the leading end of the hammer shank 43. Reference numeral 46 designates a catcher frontward projecting from the hammer butt 41.

A shutter plate 71 and a photo coupler 77 serve in combination as the hammer sensor 70. The shutter plate 71 is attached to the hammer shank 43, and rearward projects form the hammer shank 43. The shutter plate 71 is moved together with the hammer shank 43, and is movable with respect to the associated music string S. A slit 71a is formed in the leading end portion of the shutter plate 71. On the other hand, the photo coupler is attached to brackets, and is stationary with respect to the associated music string S. The photo coupler 77 consists of a light emitting element and a light detecting element, and a light beam P is radiated from the light emitting element to the light detecting element. When the hammer is staying at the rest position, the shutter plate 71 is spaced from the light bean P as indicated by the real line, and the photo coupler supplies a hammer position signal of a high voltage level to a data processing unit (not shown).

A player is assumed to depress the associated key. The depressed key actuates the associated action mechanism, and the action mechanism drives the hammer for rotation. When the hammer reaches an intermediate position H2, the shutter plate 71 interrupts the light beam P at the leading end thereof, and the hammer position signal falls to a low voltage level. The data processing unit acknowledges that the hammer head 44 reaches the intermediate position H2. The hammer is further rotated, and reaches the next intermediate position H3. Then, the slit 71a is aligned with the light beam P, and the photo coupler 71 recovers the hammer position signal to the high voltage level. The data processing unit acknowledges that the hammer reaches the next intermediate position H3. The distance between the intermediate positions H2 and H3 is known, and the data processing unit is notified the times when the hammer shank 43 reaches the intermediate position H2 and the intermediate position H3. The data processing unit determines the interval between two interrupting times, and calculates the hammer velocity between the intermediate positions H2 and H3. The intermediate positions H2 and H3 are arranged in such a manner as to be close to the final position where the hammer head 44 strikes the music string S, because the hammer velocity is exactly proportional to the intensity of the impact between the hammer head 44 and the music string S and, accordingly, the loudness of the original sound. The prior art data acquisition system formats the piece of music data information exactly representative of the loudness. When the automatic playing system reproduces the sound on the basis of the music data codes, the hammer strikes the music string S at the intensity equal to that in the original performance, and the music string S reproduces the sound at the original loudness.

The hammer sensors 70 are expected to detect the hammer velocity in the monitoring section between the intermediate positions H2 and H3 arranged to be as close to the music string S as possible. However, it is impossible to keep all the hammer sensors at the appropriate positions. This is because of fact that the distance between the hammers at the rest positions and the associated music strings S is varied. The variance is of the order of 2 millimeters in standard grand pianos.

In detail, the hammers are rotatably supported by a shank flange rail, which in turn is supported by the action brackets. The action brackets are mounted on the key bed. The total weight of the hammers is exerted on the shank flange rail, and the shank flange rail is less deformed. The action mechanisms are also supported by the action brackets. However, the total weight of the hammers, the action mechanisms, the action brackets and the keyboard is not so large that the key bed can support them without substantial deformation. For this reason, the rest positions of hammers are stationary over the key bed. On the other hand, the strings are stretched over a frame, and are anchored at ends thereof to the pitch pins and at the other ends thereof to the tuning pins. The total tension is of the order of 20000 kg. Although the frame is formed of cast iron, the frame is deformed due to the large tension, and the distance between the key bed and the music strings S is not constant.

As shown in FIG. 2, the key bed KB horizontally extends between both end portions of the side board SB, and the music strings S are stretched over the key bed KB. The distance between the key bed KB and the music strings S is increased from the higher-pitched part toward the lower-pitched part. The distance at the rightmost music string S is 196 millimeters, and is increased to 197 millimeters at the center music string S. The difference is 2 millimeters. Even if the rightmost hammer sensor 70 is adjusted in such a manner that the intermediate positions H2 and H3 are spaced from the associated music string S by 5.5 millimeters and 0.5 millimeter, the hammer sensor 70 for the center music string has the intermediate positions H2 and H3 at 7.5 millimeters and 2.5 millimeters spaced from the center music string S. The data processing unit determines the hammer velocity in the different parts of the trajectories of the hammers, and the reproduced sounds are not always equal in loudness to the original sounds. Moreover, the hammer sensors 70 are supported by the brackets as described hereinbefore. If the brackets are deformed, the difference becomes further serious.

The difference in monitoring section has serious influences on the loudness of reproduced sounds. When a pianist ordinarily depresses a key, the hammer strikes the associated music string through uniform motion. The hammer velocity is considered to be constant, and the difference between the initial hammer velocity and the final hammer velocity is ignoreable. The hammer velocity at an arbitrary part of the trajectory is considered to be proportional to the loudness. If the pianist softly depresses the key, the hammer is also driven for rotation at the escape of the jack from the hammer butt. However, the hammer is decelerated after the escape.

Only the hammer velocity immediately before the strike is proportional to the loudness. Thus, it is important to determine the hammer velocity in the final part of trajectory immediately before striking the music string.

In general, the longer the monitoring section, the higher the precision. It is desirable to prolong the monitoring section between the intermediate positions H2 and H3 in so far as the hammers are considered to travel through the uniform motion. However, a short monitoring section is desirable for the hammers gradually decelerated toward the music string. Thus, the appropriate monitoring section is to be varied depending upon the hammer motion.

As described hereinbefore, the prior art hammer sensors 70 have the monitoring sections, which are constant in length and unintentionally moved on the trajectories of the hammers due to the deformation of the frame. When the manufacturer regulates the monitoring sections individually, a large amount of time and labor is consumed, and a special regulating mechanism is required for the hammer sensors 70. This results in increase of the production cost. After the delivery, it is quite difficult to tune the hammer sensors. This is the first problem inherent in the prior art data acquisition system incorporated in the keyboard musical instrument such as the automatic player piano.

On the other hand, if the manufacturer delivers the products of the prior art automatic player piano without any regulation, a set of music data codes does not exactly represent the original performance, and another problem is encountered in the fidelity. The prior art automatic player piano is usually responsive to a set of music data codes recorded through another keyboard musical instrument. The music data codes have been normalized, and the pieces of music data information stored therein are individuated for the prior art automatic player piano used in the playback. The individuality of the prior art automatic player piano is determined on the basis of pieces of data information obtained through the hammer sensors 70. If the monitoring sections are unintentionally moved on the trajectories of the hammers, the difference among the monitoring sections has influences on the individuality, and the reproduced sounds are different from the original performance. Thus, the second problem is the fidelity in the playback.

SUMMARY OF THE INVENTION

It is therefore an important object of the present invention to provide a keyboard musical instrument, which faithfully reproduces an original performance without complicated tuning.

It is also an important object of the present invention to provide a data acquisition system, which exactly determines a physical quantity of moving objects incorporated in a keyboard musical instrument.

To accomplish the object, the present invention proposes to monitor a moving object in a whole range of motion.

In accordance with one aspect of the present invention, there is provided a keyboard musical instrument comprising a keyboard having at least one key manipulated by a player, at least one beating member linked with the at least one key and moved between a rest position and an impact position when the at least one key is manipulated, a beaten member struck with the at least one beating member at the impact position, at least one sensor continuously monitoring the at least one beating member moved between the rest position and the impact position for producing an output signal representative of a physical quantity of the beating member in the range between the rest position and the impact position and an information generating system connected to the at least one sensor and generating pieces of data representative of a motion of the at least one beating member on the basis of the output signal.

In accordance with another aspect of the present invention, there is provided a data acquisition system for a moving object comprising at least one sensor monitoring the moving object in a whole range of motion thereof for producing a first output signal representative of a continuous variation of a physical quantity of the moving object and a data processing system connected to the at least one sensor and extracting pieces of data information from the variation of the physical quantity for producing a second output signal representative of a meaning of the motion.

BRIEF DESCRIPTION OF THE DRAWINGS

The features and advantages of the keyboard musical instrument and the data acquisition system will be more clearly understood from the following description taken in conjunction with the accompanying drawings in which.

DESCRIPTION OF THE PREFERRED EMBODIMENTS

First Embodiment

Figure 3:
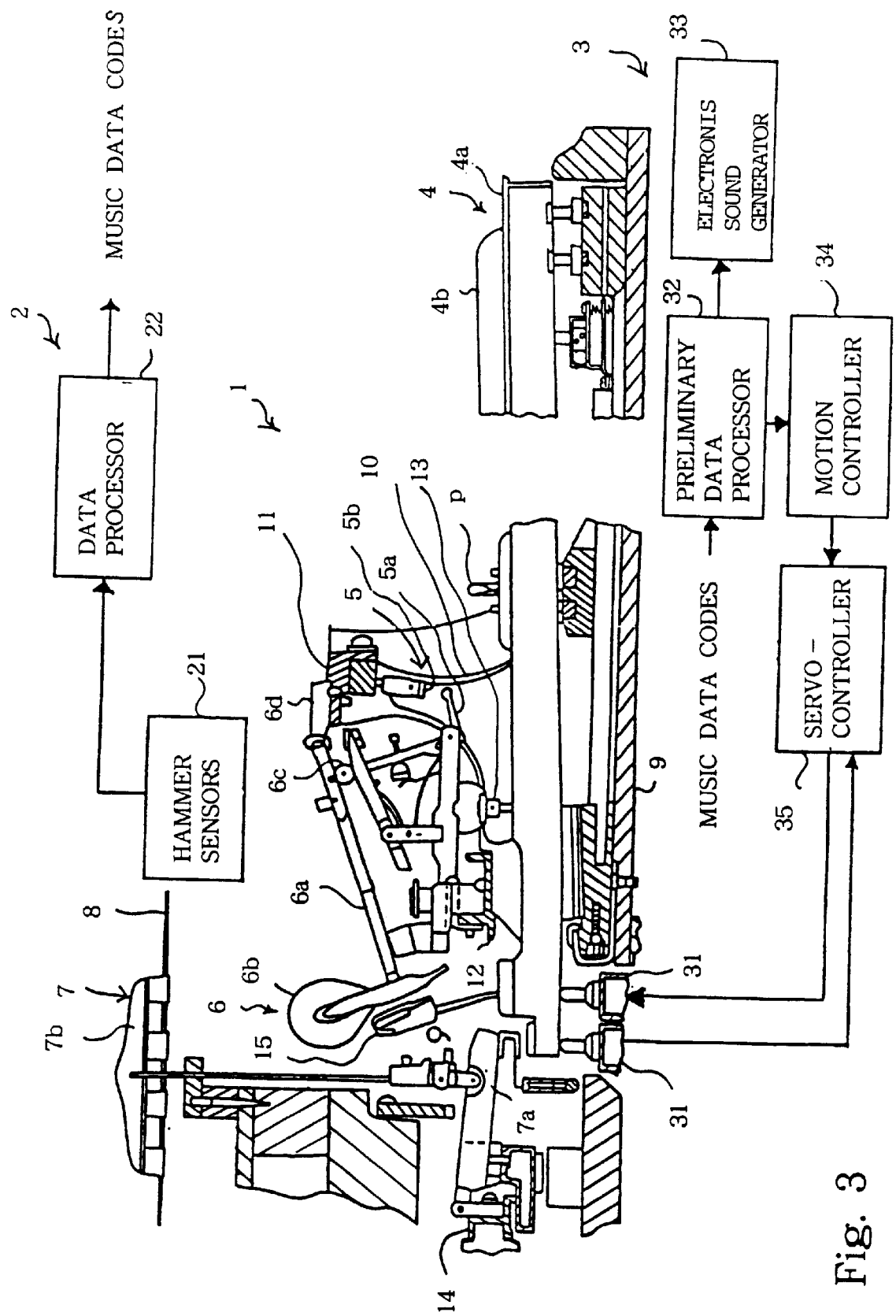
FIG. 3 is a cross sectional side view showing the arrangement of essential parts of an automatic player piano according to the present invention.

Referring to FIG. 3 of the drawings, an automatic player piano embodying the present invention largely comprises a grand piano 1, a data acquisition system 2 and a playback system 3. The grand piano 1 includes a keyboard 4, action mechanisms 5, hammers 6, damper mechanisms 7 and music strings 8. Though not shown in FIG. 3, these component parts 4, 5, 6, 7 and 8 are accommodated in a piano case, and a key bed 9 forms a part of the piano case. Plural white keys 4a and plural black keys 4b are laid on the well-known pattern, and are turnable around balance pins P. The white keys 4a and the black keys 4b form the keyboard 4, and the keyboard 4 is mounted on the key bed 9. Action brackets 10 are further mounted on the key bed 9, and a shank flange rail 11 is supported by the action brackets 10. The shank flange rail 11 laterally extends over the keyboard 4, and the hammers 6 are rotatably supported by the shank flange rail 11. The hammer 6 has a hammer shank 6a rotatable with respect to the shank flange rail 11 and a hammer head 6b attached to the leading end of the hammer shank 6a.

The music strings 8 extend over the hammers 6. Though not shown in figure 3, the music strings 8 are stretched between hitch pins and tuning pins. These pins are secured to the frame structure as similar to the standard grand piano. The music strings 8 are respectively associated with the hammers 6, and are to be struck with the hammer heads 6b of the associated hammers 6.

The damper mechanisms 7 are associated with the music strings 8 and the white/black keys 4a/4b. The damper mechanism 7 has a damper lever 7a and a damper head 7b. A damper rail 14 laterally extends at the back of the keyboard 4, and the damper levers 7a are rotatable around the damper rail 14. The damper lever 7a frontward projects from the damper rail 14, and reaches the space over the rear end portion of the associated white/black key 4a/4b.

The damper heads 7b are linked with the damper levers 7a, respectively. The damper heads 7b allow the associated music strings 8 to vibrate before striking the music strings 8 with the hammers 6, and absorb the vibrations of the associated music strings 8 after releasing the depressed keys 4a/4b.

A center rail 12 is further supported by the action brackets 10, and laterally extends over the keyboard 4. Each of the action bracket 5 is turnably connected to the center rail 12, and is held in contact with a capstan screw 13 partially embedded into the associated white/black key 4a/4b. A back check 15 upwardly projects from the rear end portion of each white/black key 4a/4b, and gently receives the associated hammer 6 after rebounding on the music string 8. The hammer 6 has a hammer roller 6c, and the action mechanism 5 has a jack 5a. The action mechanism 5 drives the associated hammer 6 for rotation through the escape between the jack 5a and the hammer roller 6c.

While the associated white/black key 4a/4b is staying at the rest position, the hammer roller 6c is held in contact with the leg portion of the jack 5a, and the damper heads 7b are held in contact with the associated music strings 8. A pianist is assumed to depress a white/black key 4a/4b. The white/black key 4a/4b is rotated around the balance pin P in the clockwise direction. The white/black key 4a/4b pushes up the damper lever 7a, and the capstan screw 13 pushes up the associated action mechanism 5. Thus, the white/black key 4a/4b gives rise to the rotation of the damper lever 7a around the damper rail 14 and the rotation of the action mechanism 5 around the center rail 12 on the way from the rest position toward the end position.

The damper lever 7a lifts up the damper head 7b, and, accordingly, spaces the damper head 7b from the associated music string 8. Thus, the damper mechanism 7 gets the music string 8 ready for vibrations. The toe of the jack 5a is brought into contact with an associated regulating button 5b. Then, the jack 5a escapes, and the hammer 6 starts the free rotation toward the associated music strings 8. The hammer head 6b strikes the associated music string 8, and rebounds thereon. The music strings 8 vibrates for generating the piano sound, and the back check 15 receives the hammer 6. The back check 15 keeps the hammer 6 over the action mechanism 5 for a time.

The pianist releases the depressed white/black key 4a/4b, and the released white/black key 4a/4b returns toward the rest position. The rear end portion of the white/black key 4a/4b permits the damper lever 7a to rotate around the damper rail 14 in the clockwise direction, and the damper head 7b is brought into contact with the vibrating music string 8 for absorbing the vibrations. The toe is spaced from the regulating button 5b, and the leg slides into the space under the hammer roller 6c. Thus, the action mechanism 5 and the hammer 6 return to the respective rest positions.

The data acquisition system 2 includes hammer sensors 21 and a data processor 22. The hammer sensors 21 are assigned to the hammers 6, respectively, and monitor the associated hammers 6 over the entire trajectories thereof. The hammer sensors 21 are connected to the data processor 22, and supply hammer position signals representative of current hammer positions of the associated hammers 6 on the trajectories. The data processor 22 produces a set of music data codes representative of an original performance on the keyboard 4 through a data acquisition described hereinlater in detail. The data processor 22 writes the set of music data information in a suitable memory such as, for example, a hard disk, an optical disk, a floppy disk or a semiconductor memory device. The hammer sensors 21 will be also described hereinlater in detail.

The playback system 3 includes solenoid-operated key actuators 31, a preliminary data processor 32, an electronic sound generator 33, a motion controller 34 and a servo-controller 35. A set of music data codes is supplied from the data interface or the suitable memory to the preliminary data processor 32. The preliminary data processor 32 determines a target trajectory of each of the depressed/released keys 4a/4b and a target key velocity (t, Vr) on the target trajectory. The preliminary data processor 32 produces control data codes representative of the white/black keys 4a/4b to be moved on the target trajectories and the target key velocity (t, Vr) for each white/black key 4a/4b. The preliminary data processor 22 supplies the control data codes to the motion controller 34. The preliminary data processor 22 is further connected to the electronic sound generator 33. If the control data codes are transferred from the preliminary data processor 32 to the electronic sound generator 33, the electronic sound generator 33 reproduces electronic sounds. Though not shown in FIG. 3, a manipulating panel is incorporated in the playback system 3, and a user instructs the playback system to reproduce the original performance through the solenoid-operated key actuators 31 or the electronic sound generator 33.

The motion controller 34 analyzes the control data codes, and determines the target key velocity at a series of target key positions on the target trajectory. The target key position is varied together with time, and the relation between the target key velocity Vr and time is converted to the relation between the target key velocity Vr and the target key position. The target key velocity Vr at the target key position is supplied to the servo-controller 35. The servo-controller 35 determines the magnitude of a driving pulse signal, and supplies the driving pulse signal to the solenoid-operated key actuator 31 associated with the white/black key 4a/4b to be moved.

The solenoid-operated key actuator 31 is equipped with a plunger sensor (not shown). The plunger sensor monitors the plunger of the solenoid-operated key actuator 31, and produces a feedback signal. The plungers push up the white/black keys 4a/4b, respectively, and give rise to the rotation of the associated white/black keys 4a/4b. For this reason, the actual plunger position is corresponding to the actual key position. The feedback signal is representative of the actual plunger position and, accordingly, the actual key position, and is supplied from the plunger sensor to the servo-controller 35. The servo-controller 35 calculates the actual plunger velocity and, accordingly, the actual key velocity, and compares the target key velocity at each target key position with the actual key velocity at the actual key position to see whether or not the white/black key 4a/4b is moved on the target trajectory. If the actual key velocity is different from the target velocity, the servo-controller 35 changes the magnitude of the driving pulse signal so as to make the actual key velocity equal to the target key velocity at the next target position. As a result, the solenoid-operated key actuator 31 gives rise to a strike at the music string 8 with the hammer 6 associated with each white/black key 4a/4b. The music strings 8 vibrate for producing the piano sounds equal in loudness to the original piano sounds, because each the hammer 6 is controlled to have the final hammer velocity equal to the final hammer velocity in the original performance.

In summary, the playback system 3 sequentially energizes the solenoid-operated key actuators 31, and the solenoid-operated key actuators 31 give rise to the rotation of the associated white/black keys 4a/4b. The action mechanisms 5 are sequentially actuated by the white/black keys 4a/4b so as to drive the associated hammers 6 for the rotation. The hammers 6 strike the associated music strings 8 in the same order in the original performance at the same intensity. The music strings 8 produces the piano sounds equal in loudness to the original piano sounds, and reproduces the original performance through the piano sounds.

Figure 4:
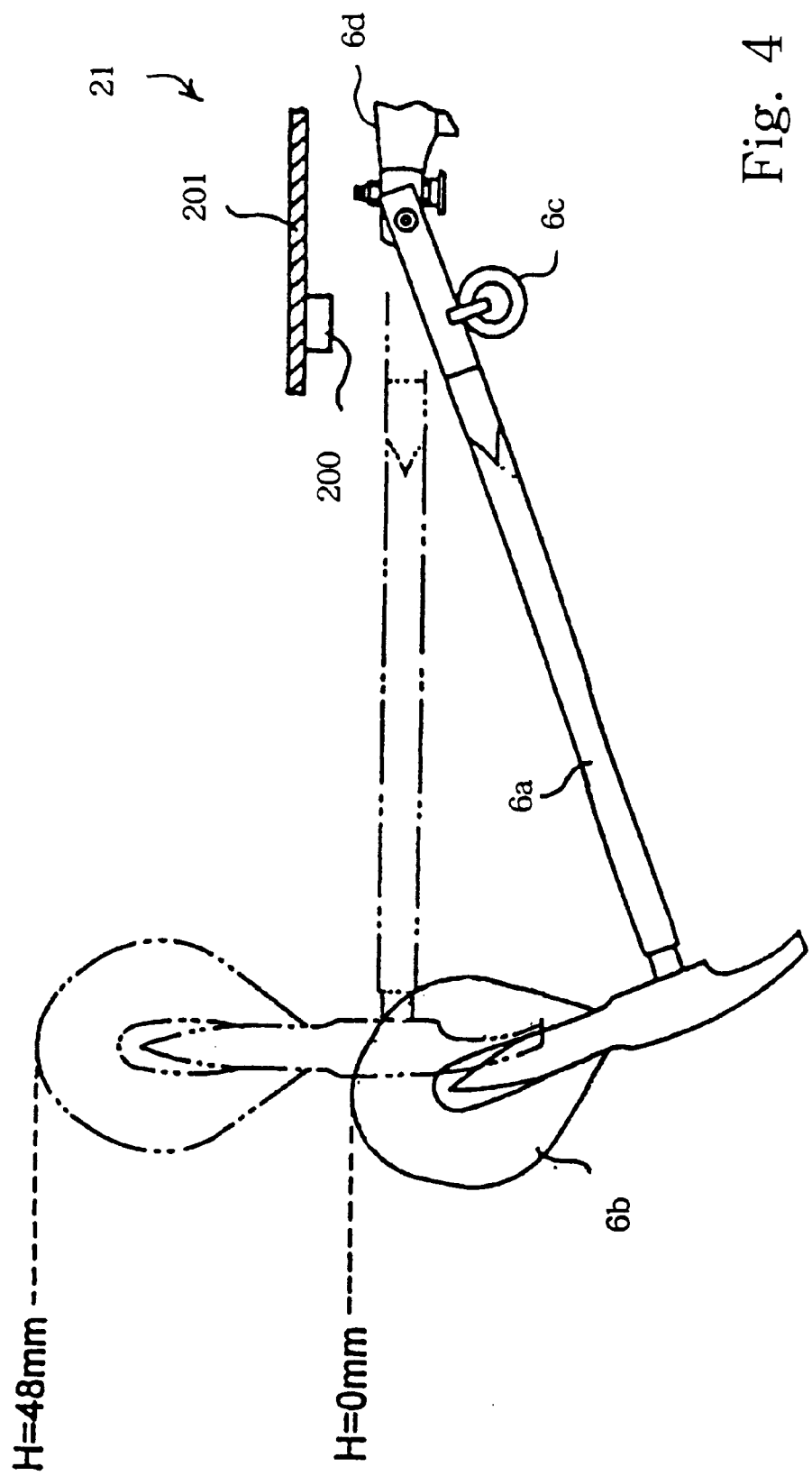
FIG. 4 is a side view showing a hammer sensor for monitoring a hammer incorporated in the automatic player piano.

FIG. 4 illustrates the hammer sensor 21 associated with one of the hammers 6. When the associated music string 8 is struck with the hammer head 6b, the hammer head 6b is positioned at 48 millimeters over the rest position. The hammer sensor 21 is implemented by a photo-coupler 200, i.e., a light emitting element and a light detecting element. The photo-coupler 200 is attached to a bracket 201. The bracket 201 laterally extends over the shank flange 6d, and is shared between the photo-coupler 200 and other photo-couplers associated with other hammers 6.

Figure 5B:
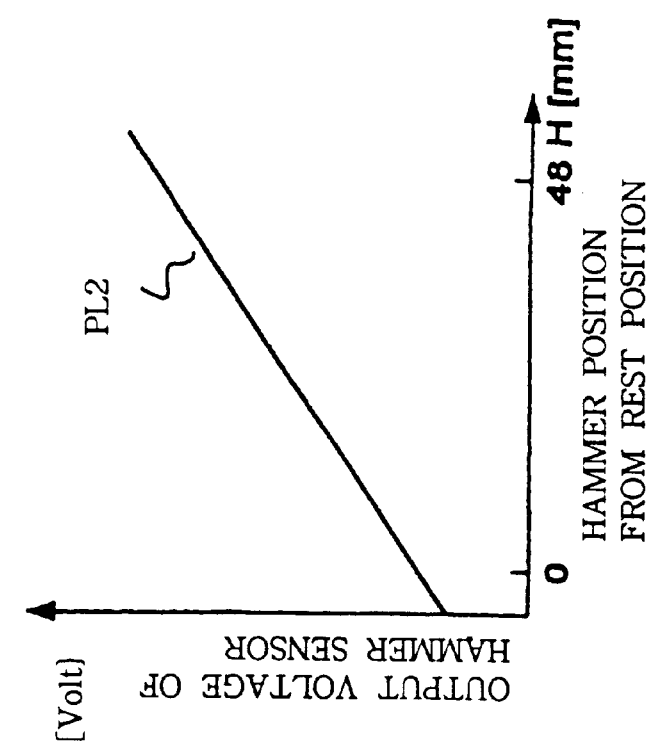
FIG. 5B is a graph showing a linearized relation between the hammer position and the output voltage.
Figure 5A:
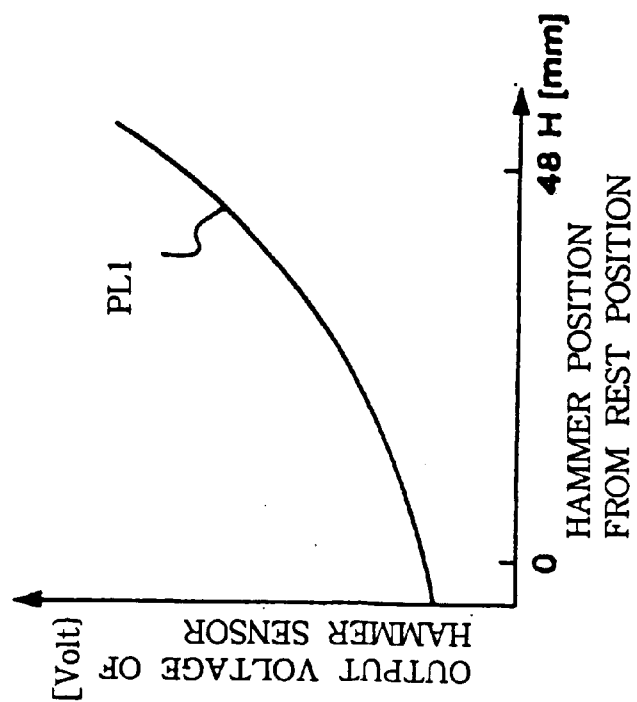
FIG. 5A is a graph showing an actual relation between a hammer position and the output voltage of a light detecting element.

The light emitting element radiates a light beam toward the hammer shank 6a, and the light beam is reflected on the hammer shank 6a. Part of the reflection is fallen onto the light detecting element, and is converted to photo-current. The photo-current is converted to an output voltage, and the output voltage is varied together with the hammer position as indicated by plots PL1 shown in FIG. 5A. The relation between the hammer position and the output voltage is represented by a curve, and is less convenient for a data processing. For this reason, the relation is linearized as indicated by plots PL2 in FIG. 5B. The data processor 22 stores a table representative of the linearized relation between the hammer position and the output voltage in a suitable memory.

While the hammer 6 is rotating from the rest position toward the music string 8 on a forward trajectory, the hammer sensor 21 varies the output voltage of the hammer position signal, and the data processor 22 converts the output voltage to a corresponding binary value on the plots PL2. The data processor 22 stores the series of hammer positions on the forward trajectory together with the lapse of time at which the hammer 6 passes each of the hammer positions. The data processor 22 checks the table to see where the hammer 6 is, and determines the actual hammer position. The hammer 6 strikes the associated music string 8, and, thereafter, rebound thereon. The hammer 6 is backward rotated on a backward trajectory, and is gently received by the back check 15. The hammer sensor 21 continuously measures the current hammer position on the backward trajectory, and the hammer sensor 21 decreases the output voltage. When the hammer 6 reaches the back check 15, the hammer sensor 21 keeps the output voltage constant. The pianist releases the white/black key 4a/4b. Then, the hammer 6 restarts the backward rotation, and the hammer sensor 21 further decreases the output voltage. The hammer positions are also represented by the hammer position signal, and are stored in the memory together with the lapse of time.

The intensity of the reflection is varied with time due to, for example, contaminant on the hammer shank 6a, and the relation represented by plots PL2 is variable. For this reason, the data processor 22 sequentially measures the output voltages of the hammer sensors before the data acquisition in an original performance, by way of example, and rewrites the table in the memory. Thus, the hammer sensors 21 are calibrated before the data acquisition.

Figure 6:
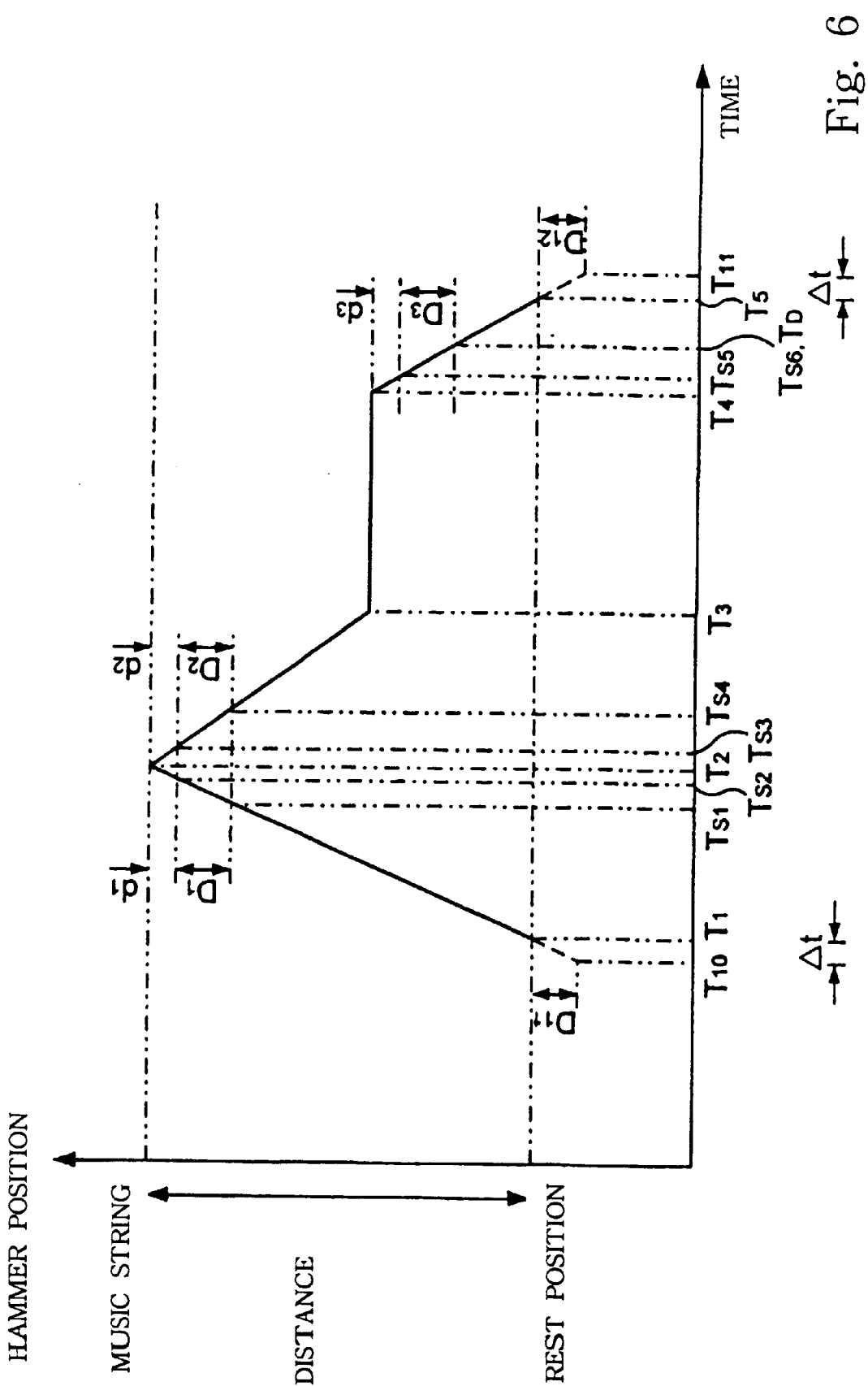
FIG. 6 is a diagram showing a trajectory of a hammer between the rest position and a strike at the associated music string.

Description is hereinbelow made on the data acquisition during an original performance on the keyboard 4. The data processor 22 determines an initiation time for rotation of a hammer, an impact time, a final hammer velocity, an initiation time for downward motion of a white/black key, a time for catching a hammer, a time for releasing a hammer, a hammer velocity after leaving a back check, a time for pressing a damper, a time for finishing a hammer motion and a time for finishing a key motion on the basis of a series of current hammer positions. These are hereinbelow referred to as "first, second, third, fourth, fifth, sixth, seventh, eighth, ninth and tenth pieces of music data information". The first to tenth pieces of music data information are required for reproduction of an original performance, and described in detail with reference to FIG. 6.

1. The first piece of music data information is representative of the initiation time T1 at which the hammer 6 starts the rotation from the rest position toward the associated music string 8. Although the hammer 6 starts the rotation after the initiation of the downward motion of the associated white/black key 4a/4b, the data processor 22 can determine the initiation time T1, because the hammer sensor 21 monitors the entire trajectory of the hammer 6.

Figure 1:
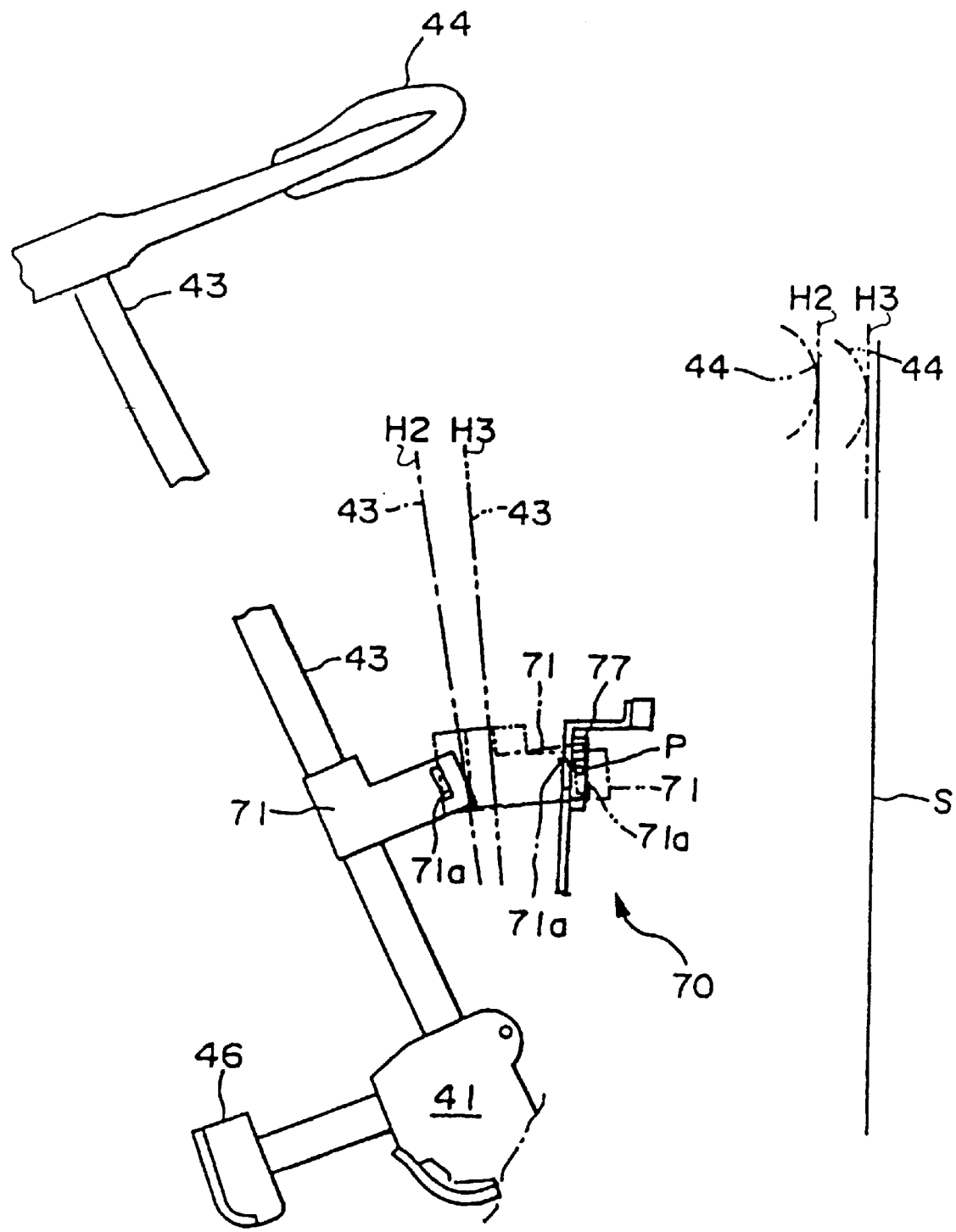
FIG. 1 is a side view showing the hammer sensor incorporated in the prior art data acquisition system.
Figure 2:
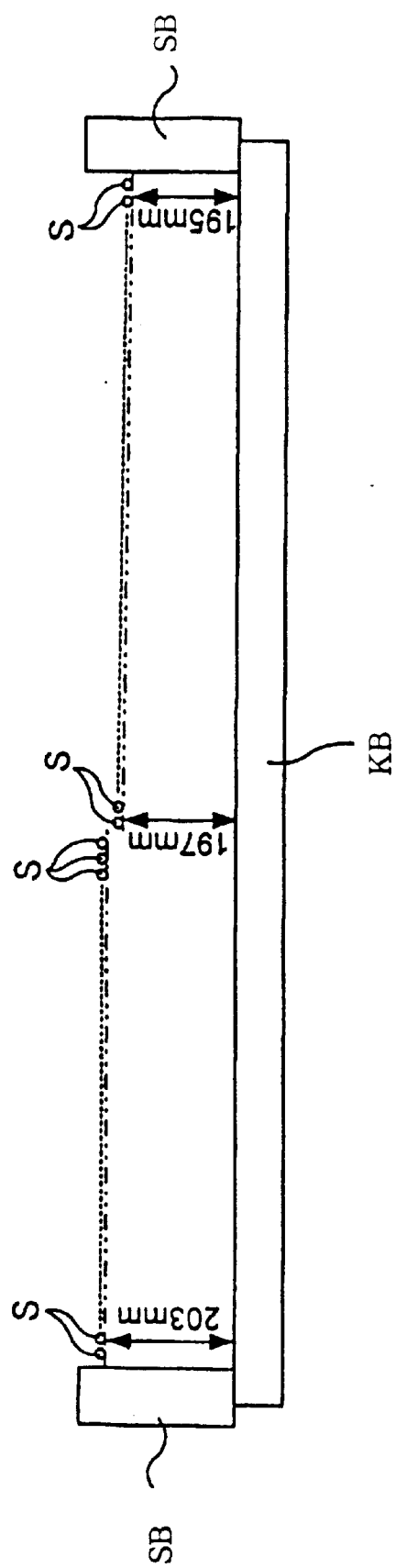
FIG. 2 is a front view showing the music strings incorporated in the prior art grand piano.

2. The second piece of music data information is representative of the impact time T2 at which the hammer 6 strikes the associated music string 8. When the hammer 6 strikes the associated music string 8, the hammer rebounds on the music string 8, and starts the rotation in the opposite direction. The data processor 22 searches the series of hammer positions for the rebounding point, and determines the impact time T2. The impact time is corresponding to "note-on timing" used in generation of electronic sounds. In the prior art data acquisition system, the impact time is estimated on the basis of the key motion. Although another prior art data acquisition system has hammer sensors of the type having a pair of photo-couplers radiating light beams across the trajectory of the associated hammer (see FIG. 1), the prior art data acquisition system incorporated therein estimates the impact time on the basis of the interruption of the light beam. However, the prior art hammer sensor does not directly detect the rebounding point. The impact time is liable to be different from the rebounding time due to the deformation of the frame as described hereinbefore in conjunction of the prior art data acquisition system. The data acquisition system 2 according to the present invention detects the rebounding time, and determines the impact time. For this reason, the second piece of data information exactly represents the impact time. When the impact time is stored in the music data code as the note-on, the electronic sound generator 33 produces the electronic sounds at time intervals exactly matched with those in the original performance.

3. The third piece of music data information is representative of the final hammer velocity. D1 is a detecting section for calculating the hammer velocity. In this instance the detecting section D1 is assumed to be 5 millimeters long. Distance d1 is between the end of the detecting section D1 and the associated music string 8. The distance d1 is determinable by subtracting the hammer position at the end of the detecting section D1 from the hammer position at the rebounding point. In this instance, the distance d1 is assumed to be 0.5 millimeter. In other words, if the manufacturer gives a constant value to the distance d1 on the trajectories of all the hammers 6, the detecting sections D1 are equally spaced from the music strings 8, and the hammer velocity in the detecting sections D1 is used as the final hammer velocity. When a set of hammer position is stored in the data processor 22 for one of the hammers 6, the data processor 22 can determine time Ts1 and time Ts2. Then, the data processor 22 calculates the final hammer velocity V1 as follows.

$$V1=(Ts2-Ts1)/D1 \qquad \text{Equation 1}$$

The hammer velocity after the rebound is similarly determinable. The manufacturer determines a distance d2 from the associated music string 8 and a detecting section D2. The data processor 21 searches the set of hammer positions for both ends of the detecting section D2, and determines time Ts3 and time Ts4. The released hammer velocity in the detecting section is calculated as similar to the final hammer velocity. Thus, the detecting sections D1 are individually determined with respect to the actual positions of the associated music strings 8. For this reason, the deformation of the frame does not have any influence on the calculation for the final hammer velocity and the released hammer velocity. Since the loudness is proportional to the final hammer velocity, the music data codes representative of the final hammer velocity exactly represent the loudness to be given to the reproduced sounds.

4. The fourth piece of music data information is representative of the initiation time for downward motion of a white/black key. There is a time lug between the key motion and the hammer motion. A virtual traveling path D11 is introduced into the forward trajectory. The hammer 6 is assumed to trace back the forward trajectory to the past. The hammer 6 consumes a time Δt. If the hammer starts the rotation concurrently with the white/black key 4a/4b, the hammer rotation will be initiated at time T10. The time T10 is the initiation time for the downward motion of the associated white/black key 4a/4b. The virtual traveling path D11 is dependent on the initial hammer velocity and, accordingly, the final hammer velocity V1. For this reason, the relation between the final hammer velocity and the virtual traveling path D11 is tabled in the memory of the data processor. When the data processor 22 calculates the final hammer velocity, the data processor 22 searches the table for the virtual traveling path D11, and determines the initiation time for the downward motion. The playback system 3 supplies the driving pulse signal to the solenoid-operated key actuator 31 so as to start the downward motion of the white/black key 4a/4b at the initiation time T10. For this reason, the fourth piece of music data information is stored in a music data code as a key-on timing for the mechanically sound producing system such as the solenoid-operated key actuators 31.

5. The fifth piece of music data information is representative of the time for catching a hammer. As described hereinbefore, the hammers 6 are landed on the associated back checks 15, respectively. The back check 15 stops the associated hammer 6 thereon, and keeps the associated hammer 6 unchanged for a time. The data processor 22 searches the memory for the hammer positions unchanged for a time after the impact time T2. The hammer position is unchanged from T3 to T4 in the backward trajectory shown in FIG. 6. When the data processor 22 finds T3, the data processor 22 determines the time for catching a hammer at T3.

6. The sixth piece of music data information is representative of the time for releasing a hammer. As described hereinbefore, the rebounding hammer 6 is landed on the associated back check 15, and the back check 15 keeps the hammer 6 thereon for a time. When the pianist releases the white/black key 4a/4b, the action mechanism 5 returns toward the rest position together with the released white/black key 4a/4b, and the hammer 6 is rotated toward the rest position. The data processor 22 finds the hammer position increased with time, and determines the time for releasing a hammer at T4.

7. The seventh piece of music data information is representative of the hammer velocity after leaving a back check. A detecting section D3 is determined on the backward trajectory, and is spaced from the hammer position at T3 and T4 by a distance d3. The data processor 22 adds the distance d3 to the constant hammer position between T3 and T4, and determines the end point of the detecting section D3 and time Ts5. The data processor 22 further adds the length of the detecting section D3 to the end point, and determines the other end point of the detecting section and time Ts6. The length of the detecting section D3 has been known to the data processor. Then, the data processor 22 calculates the hammer velocity after leaving the back check.

8. The eighth piece of music data information is representative of the time for pressing a damper. The released white/black key 4a/4b permits the damper head 7b to be brought into contact with the associated music string 8, and the piano sound is decayed. The key motion after the release is corresponding to the hammer motion after the time T4 for leaving the back check. In other words, a certain hammer position is equivalent to the key position at which the damper head 7b is brought into contact with the associated music string 8. In this instance, the damper head 7b is assumed to be brought into contact with the music string 8 at the hammer position at Ts6. For this reason, the data processor 22 determines the time for pressing the damper at $T_D$ equal to Ts6. When the damper head 7b is brought into contact with the music string 8, the piano sound is decayed. The time $T_D$ is equivalent to "note-off timing" for an electronic sound generating system. However, the hammer position at which the hammer head 7b is brought into contact is delicately affected by the released key motion. The slower the released key motion, the later the decay. It is appropriate to vary the hammer position for the sound decay with the released key velocity. The released key velocity is estimated to be proportional to the hammer velocity in the detecting section D3. For this reason, the hammer position for the sound decay may be varied with the hammer velocity in the detecting section D3 for exactly reproducing the piano sound.

9. The ninth piece of music data information is representative of the time for finishing a hammer action. The hammers 6 reach the respective rest positions before the associated white/black key 4a/4b. When the hammer 6 reaches the rest position, the hammer 6 keeps the position constant. The data processor 22 searches the memory for the hammer position continued for a time after the hammer position between T3 and T4. In this instance, the hammer 6 reaches the rest position at T5, and the data processor 22 determines the time for finishing the hammer action at T5.

10. The tenth piece of music data information is representative of the time for finishing the key action. The released white/black key 4a/4b reaches the rest position after the hammer 6. A virtual traveling path D12 is also introduced into the backward trajectory. The virtual traveling path is equivalent to the difference between the hammer motion and the key motion. The hammer 6 is assumed to run over the rest position. The hammer 6 travels on the virtual travelling path after the rest position, and reaches the end of the virtual traveling path at time T11 concurrently with the arrival of the white/black key 4a/4b at the rest position. The data processor 22 determines the time for finishing the key action at T11. The time T11 is later than the time T5 by Δt. The length of the virtual traveling path D12 is variable together with the hammer velocity. For this reason, the relation between the hammer velocity in the detecting section D3 and the length of the virtual traveling path D12 is tabled and stored in the memory of the data processor 22. The playback system 3 controls the plunger of the solenoid-operated key actuator 31 with the driving pulse signal. The solenoid-operated key actuator 31 perfectly retracts the plunger into the bobbin (not shown) at T11, and the associated white/black key 4a/4b reaches the rest position. Thus, the time for finishing the key motion is corresponding to a key-off timing, and is stored in a music data code for the mechanically sound generating system.

The first to tenth pieces of music data information are appropriate for reproduction of the ordinary key and hammer motions, i.e., the key motion between the rest position and the end position and the hammer motion linked with the key motion. However, performances do not always consist of the ordinary key motions. A pianist may repeatedly depresses a white/black key 4a/4b without returning to the rest position at a high speed. In case of a standard grand piano, when a white/black key 4a/4b is repeatedly depressed at irregular time intervals fifteen times per second, the hammer 6 can not follow the white/black key 4a/4b, and the hammer position does not correspond to the key position. This is because of the fact that the capstan screw 13 is momentarily spaced from the action mechanism 5. In this situation, it is necessary to modify the pieces of music data information. The pianist is, by way of example, assumed to repeat the white/black key 4a/4b at regular intervals, and the data processor 22 modifies the pieces of music data information such as, for example, the fourth piece of music data information representative of the initiation time for the downward motion. In case where the data processor 22 supplies the music data codes to an electronic sound generator, the modification is not required, because the electronic sounds are generated between the impact time T2 and the time for pressing the damper head $T_D$.

While a pianist is playing a tune on the keyboard 4, the light emitting elements radiate the light beams to the associated hammer shanks 6a, respectively, and the light detecting elements converts the intensity of the light reflected on the hammer shanks 6a to the potential levels of the hammer position signals. Thus, the hammer sensors 21 monitor the associated hammers 6 to see whether or not any one of the hammers 6 starts the free rotation toward the associated music string 8. The data processor 22 starts a clock for measuring the lapse of time from the initiation of the performance on the keyboard 4. The analog hammer position signals are converted to the digital hammer position signals, and the digital hammer position signals are periodically fetched by the data processor 22 at the interface assigned to the digital hammer position signals.

The pianist fingers on the keyboard 4, and sequentially depresses the white/black keys 4a/4b in accordance with a music score. The depressed white/black keys 4a/4b actuate the associated action mechanisms 5, which in turn drive the associated hammers 6 for rotation. When the data processor 22 acknowledges the rotation of a hammer 6, the data processor 22 assigns a memory area to the hammer 6. The data processor 22 periodically checks the digital data signal representative of the current position of the hammer 6, and writes the current hammer position together with the lapse of time. Thus, a series of hammer positions is stored in the memory area, and the data processor 22 extracts the first to tenth pieces of music data information from the series of hammer positions.

If the pianist instructed the data processor 22 to produce a set of music data codes representative of the performance for the electronic sound generator 33, the data processor 22 stores the key code assigned to each manipulated white/black key, the note-on timing, the final hammer velocity, the note-off timing together with the lapse of time in the music data codes. The data processor 22 transfers the set of music data codes to a disk driver for storing the set of music data codes in the suitable memory. Otherwise, the set of music data codes is transferred through the data interface to another musical instrument.

On the other hand, if the pianist instructs the data processor 22 to produce a set of music data codes representative of the performance for the playback system 3. The data processor 22 stores the first to tenth pieces of music data information, the key code assigned to each manipulated white/black key and the lapse of time in a set of music data codes, and writes them in the suitable memory.

When a user instructs the playback system 3 to reproduce the performance, the playback system 3 reads the set of music data codes from the suitable memory. The preliminary data processor 32 starts an internal clock, and determines the target trajectory for each white/black key to be manipulated at the appropriate timing specified by the music data codes. The preliminary data processor 32 exactly reproduces the forward/backward trajectories on the basis of the first to tenth pieces of music data information, and the target trajectories are well matched with the original trajectories. The motion controller 34 and the servo-controller 35 controls the solenoid-operated key actuators 31 such that the white/black keys 4a/4b are moved on the target trajectories. The white/black keys 4a/4b actuates the associated action mechanisms 5, which in turn drive the associated hammers 6 for rotation. Each of the hammers 6 strikes the associated music strings 8 at the intensity equal to that in the original performance. Thus, the playback system 3 faithfully reproduces the original performance.

In the first embodiment, "physical quantity" is the current hammer position. The hammer 6 and the associated music string 8 serve as at least one beating member/moving object and a beaten member, respectively.

As will be understood from the foregoing description, the hammer sensors 21 monitors the hammers 6 in the whole range of the hammer motion between the rest positions and the strikes at the associated music strings. Various kinds of data information are extracted from the series of hammer positions and the lapse of time, and the original performance is exactly reproduced on the basis of the pieces of music data information.

Second Embodiment

Figure 7:
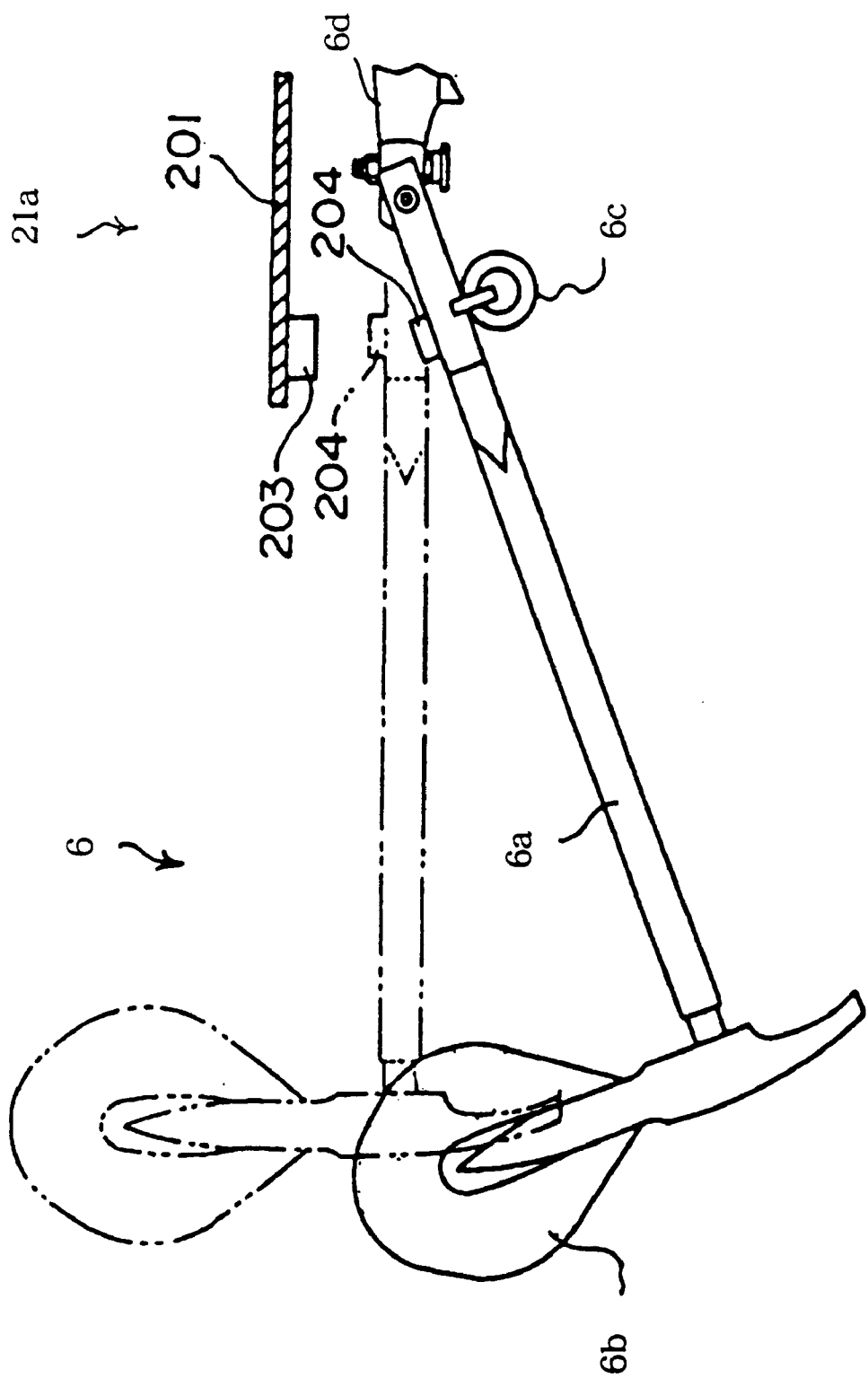
FIG. 7 is a side view showing a hammer sensor for monitoring a hammer incorporated in another keyboard musical instrument according to the present invention.

FIG. 7 shows a hammer sensor 21a incorporated in another automatic player piano embodying the present invention. The automatic player piano implementing the second embodiment is similar to the automatic player piano shown in FIG. 3 except the hammer sensors 21a. For this reason, other parts are labeled with the reference numerals designating the corresponding parts of the automatic player piano implementing the first embodiment without detailed description for the sake of simplicity.

The hammer sensors 21a monitor the associated hammers 6 over the whole range between the rest positions and the rebounding points. All the hammer sensors 21a are similar to one another, and description is focused on one of the hammer sensors 21a shown in FIG. 7. The hammer sensor 21a is implemented by a Hall element 203 and a magnetic sheet 204. The Hall element 203 is attached to a rigid board 201 laterally extending over the shank flange 6d, and the magnetic sheet 204 is attached to the hammer shank 6a. The magnetic sheet 204 creates magnetic field, and electric current flows through the Hall element 203. The magnetic sheet 204 is moved together with the hammer 6, and the Hall element 203 varies the relative position with respect to the magnetic sheet 204 in the magnetic field. The Hall element 203 varies the output voltage due to the Hall effect. The output voltage of the Hall element 203 is dependent on the relative position between the Hall element 203 and the magnetic sheet 204 as similar to the light detecting element, and, accordingly, is used as the analog hammer position signal.

The data acquisition system 2 is also incorporated in the automatic player piano implementing the second embodiment, and extracts the first to tenth pieces of music data information from a series of hammer positions. The data acquisition system 3 produces a set of music data codes representative of a performance on the keyboard 4, and stores it in a suitable memory.

The automatic player piano further includes the playback system 3. The preliminary data processor 32 determines trajectories for the white/black keys 4a/4b to be moved, and the servo-controller 35 controls the solenoid-operated key actuators 31 along the target trajectories. Thus, the automatic player piano implementing the second embodiment records an original performance, and exactly reproduces the original performance.

The hammer sensor 21a continuously detects the current hammer positions in the whole trajectories between the rest position and the rebounding position. The data processor 22 extracts the music data information from the hammer positions on the whole trajectories so that a set of music data codes exactly represents the original performance. In the second embodiment, the physical quantity is the hammer position.

Third Embodiment

Figure 8:
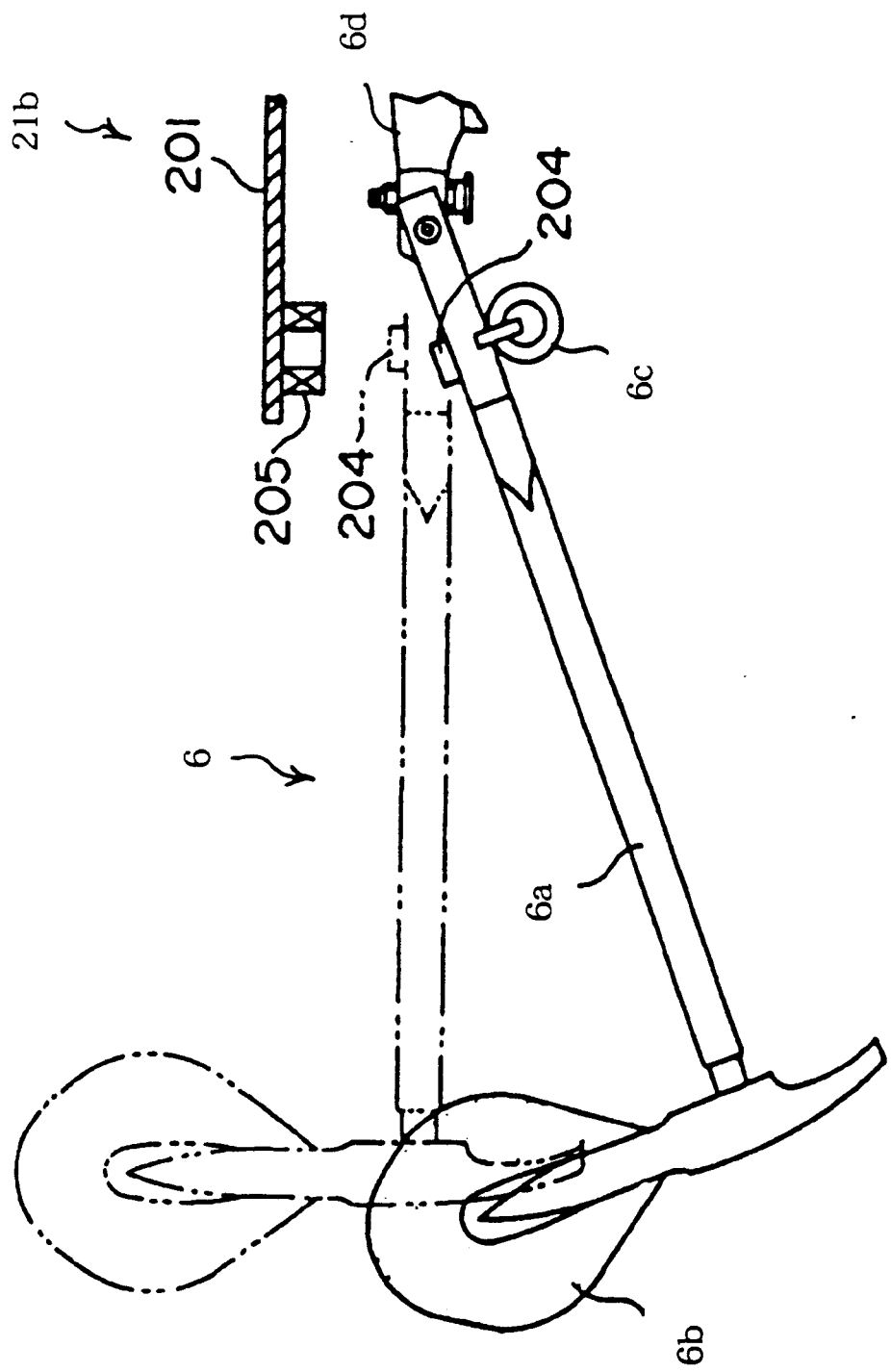
FIG. 8 is a side view showing a hammer sensor for monitoring a hammer incorporated in yet another keyboard musical instrument according to the present invention.

FIG. 8 shows a hammer sensor 21b incorporated in yet another automatic player piano embodying the present invention. The automatic player piano implementing the third embodiment is similar to the automatic player piano shown in FIG. 3 except the hammer sensors 21b. Other parts are labeled with the reference numerals designating the corresponding parts of the automatic player piano implementing the first embodiment without detailed description for the sake of simplicity.

The hammer sensors 21b monitor the associated hammers 6 over the whole trajectories between the rest positions and the rebounding points. All the hammer sensors 21b are similar to one another, and description is focused on one of the hammer sensors 21b shown in FIG. 8.

The hammer sensor 21b is implemented by the combination of a magnetic sheet 204 and a coil 205. The magnetic sheet 204 is attached to the hammer shank 6a, and the coil 205 is attached to a rigid board 201 laterally extending over the shank flange 6d. The magnetic sheet 204 is moved together with the hammer 6, and the potential difference between both ends of the coil 205 is varied depending upon the hammer velocity. Thus, the hammer sensor 21b produces a hammer velocity signal representative of the current hammer velocity. The data processor 22 periodically checks the interface assigned to the hammer position signals for fetching the hammer velocity signals. A series of values representative of the hammer velocity is stored in the memory for each of the white/black keys 4a/4b manipulated by a pianist.

The data processor 22 determines the first, second, fifth, sixth, eighth and ninth pieces of music data information at times when the detected value of the hammer velocity is zero on the trajectory of the associated hammer 6. The third and seventh pieces of music data information are directly produced from the detected values of the hammer velocity. The hammer velocity may be averaged in the detecting sections D1/D2/D3. The fourth and tenth pieces of music data information are determined on the assumption that the virtual traveling paths D11 and D12 are introduced in the trajectory.

The automatic player piano further includes the playback system 3. The preliminary data processor 32 determines trajectories for the white/black keys 4a/4b to be moved, and the servo-controller 35 controls the solenoid-operated key actuators 31 along the target trajectories. Thus, the automatic player piano implementing the second embodiment records an original performance, and exactly reproduces the original performance.

The hammer sensor 21b continuously detects the current hammer velocity in the whole range between the rest position and the rebounding position. The data processor 22 extracts the music data information from the hammer velocity in the whole range so that a set of music data codes exactly represents the original performance. In the third embodiment, the physical quantity is the hammer velocity.

Fourth Embodiment

Figure 9:
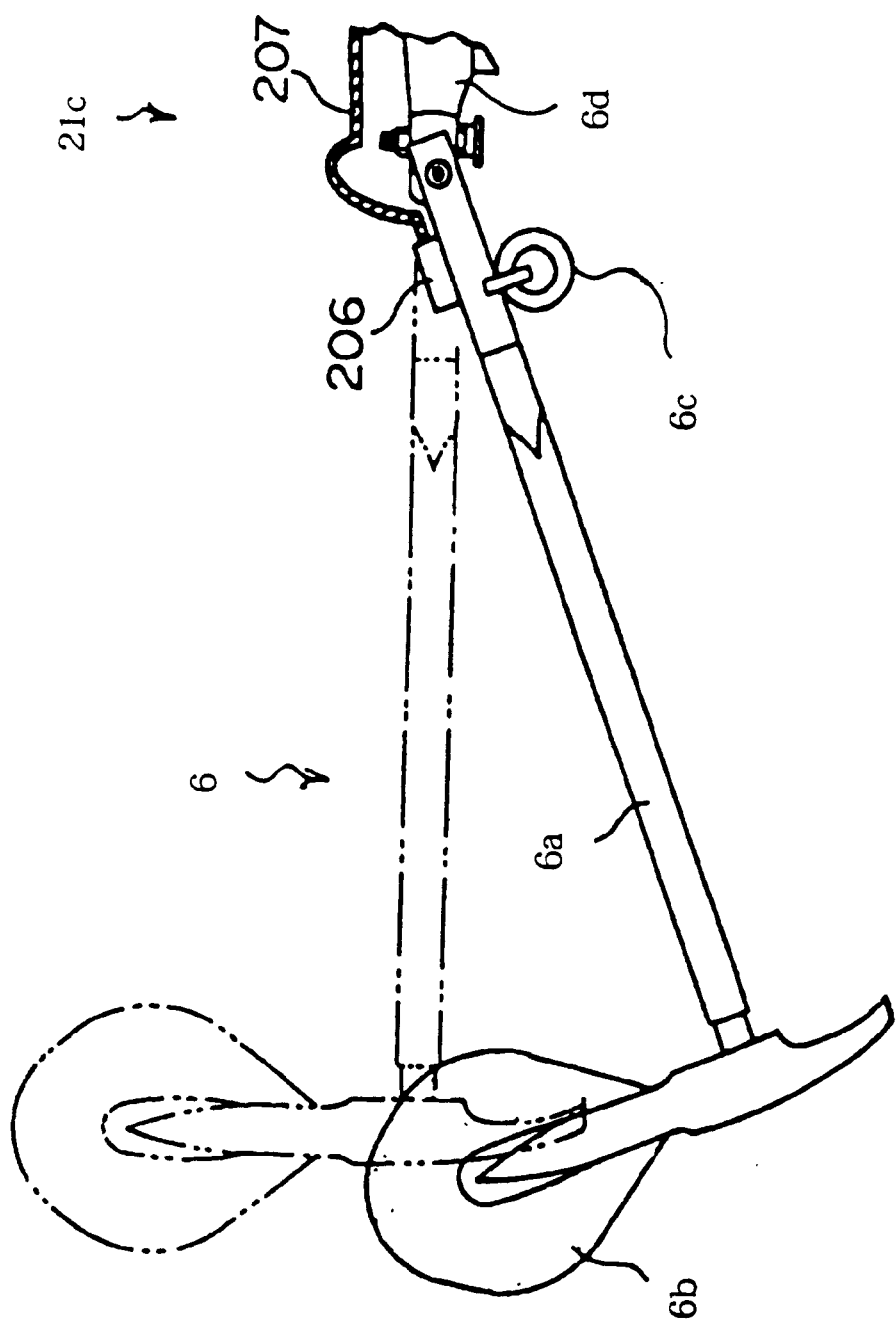
FIG. 9 is a side view showing a hammer sensor for monitoring a hammer incorporated in still another keyboard musical instrument according to the present invention.

FIG. 9 shows a hammer sensor 21c incorporated in still another automatic player piano embodying the present invention. The automatic player piano implementing the fourth embodiment is similar to the automatic player piano shown in FIG. 3 except the hammer sensors 21c. For this reason, other parts are labeled with the reference numerals designating the corresponding parts of the automatic player piano implementing the first embodiment without detailed description for the sake of simplicity.

The hammer sensors 21c monitor the associated hammers 6 over the whole range between the rest positions and the rebounding points. All the hammer sensors 21c are similar to one another, and description is focused on one of the hammer sensors 21c shown in FIG. 9.

The hammer sensor 21c is of the type detecting acceleration applied thereto. The acceleration sensor 21c includes a sensor body 206 attached to the hammer shank 6a, and a flexible sheet 207 is connected to the array of acceleration sensors 21c. A conductive pattern is printed on the flexible sheet 207, and hammer acceleration signals are transferred from the acceleration sensors 21c to the data processor through the printed conducive pattern.

The data acquisition system 2 is also incorporated in the automatic player piano implementing the fourth embodiment, and extracts the first to tenth pieces of music data information from a series of values stored as the hammer acceleration. The data processor 22 may determine the first, second, fifth, sixth, eighth and ninth pieces of music data information at times when the acceleration is changed from zero to a positive value or a negative value. The third and seventh pieces of music data information may be determined through an integration on the acceleration. The fourth and tenth pieces of music data information may be determined on the assumption that the virtual traveling paths are introduced into the trajectory. The data acquisition system 3 produces a set of music data codes representative of a performance on the keyboard 4, and stores it in a suitable memory.

The automatic player piano further includes the playback system 3. The preliminary data processor 32 determines trajectories for the white/black keys 4a/4b to be moved, and the servo-controller 35 controls the solenoid-operated key actuators 31 along the target trajectories. Thus, the automatic player piano implementing the second embodiment records an original performance, and exactly reproduces the original performance.

The hammer sensor 21c continuously detects the current hammer acceleration in the whole range between the rest position and the rebounding position. The data processor 22 extracts the music data information from the series of values representative of the hammer acceleration in the whole range so that a set of music data codes exactly represents the original performance. In the third embodiment, the physical quantity is the hammer acceleration.

Fifth Embodiment

Figure 10:
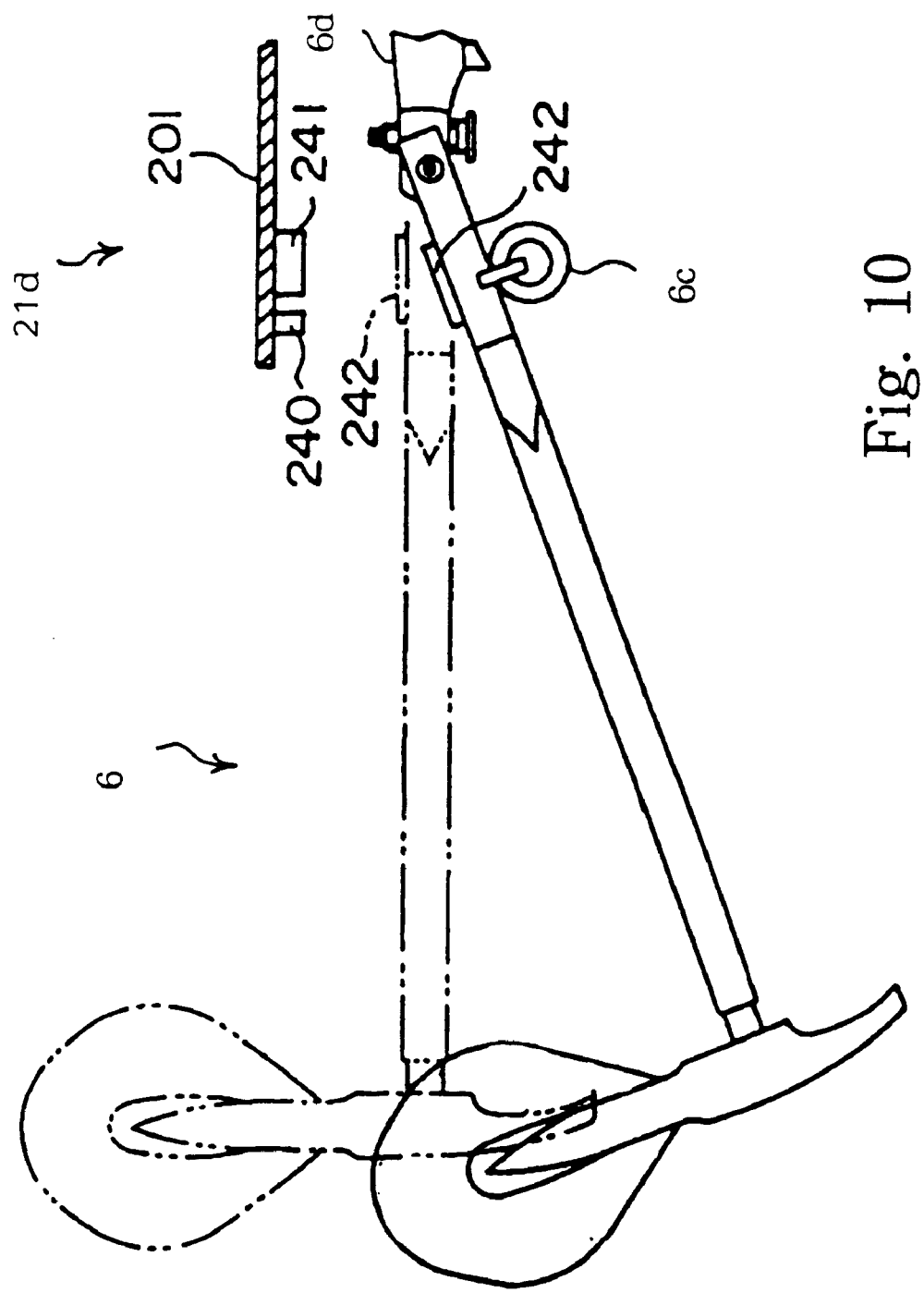
FIG. 10 is a side view showing a hammer sensor for monitoring a hammer incorporated in yet another keyboard musical instrument according to the present invention.

FIG. 10 shows a hammer sensor 21d incorporated in yet another automatic player piano embodying the present invention. The automatic player piano implementing the fifth embodiment is similar to the automatic player piano shown in FIG. 3 except the hammer sensors 21d. For this reason, other parts are labeled with the reference numerals designating the corresponding parts of the automatic player piano implementing the first embodiment without detailed description for the sake of simplicity.

Figure 11:
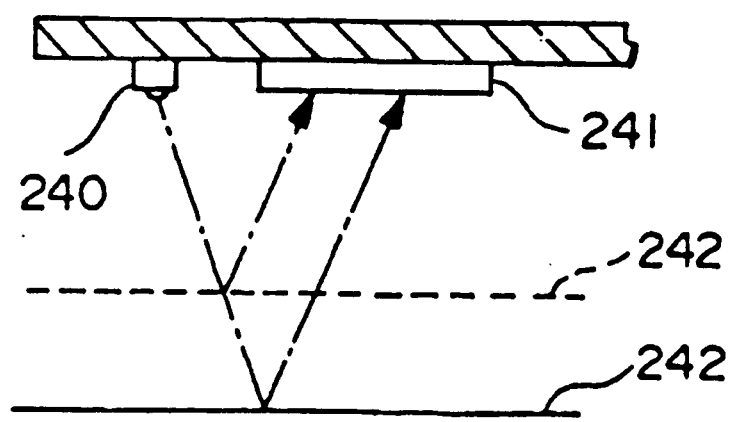
FIG. 11 is a schematic view showing an incident light fallen onto a part of a position sending device varied with a hammer position.

The hammer sensors 21d monitor the associated hammers 6 over the whole trajectories between the rest positions and the rebounding points. All the hammer sensors 21d are similar to one another, and description is focused on one of the hammer sensors 21d shown in FIG. 10. The hammer sensor 21d is implemented by the combination of a light emitting diode 240, a position sending device 241 and a reflecting sheet 242. The light emitting diode 240 and the position sending device 241 are attached to a rigid board 201 laterally extending over the shank flange 6d, and are spaced from each other. The reflecting sheet 242 is attached to the hammer shank 6a, and is moved together with the hammer 6. The light emitting diode 240 radiates a light beam to the reflecting sheet 242, and is reflected on the reflecting sheet toward the position sending device 241. Although the reflection is fallen onto the position sending device 241, the moving reflecting sheet 242 walks the incident light on the position sending device 241. For example, when the reflecting sheet 242 is positioned as indicated by broken line in FIG. 11, the reflection is incident on the left portion of the position sending device 241. The reflecting sheet 242 is assumed to be moved to the position indicated by real line together with the hammer 6. The reflection is incident on the right portion of the position sending device 241. Thus, the hammer motion gives rise to the movement of the incident light toward the right side. The position sending device 241 has a photo-electric converting region, which is connected through a current path to an output terminal. The photo-electric converting region is elongated in the direction in which the reflecting sheet 242 walks the incident light. For this reason, the reflection is incident on a narrow area in the photo-electric converting region. The photo-electric converting region generates electric charges in the narrow incident area, and the electric charge flows through the current path to the output terminal as photo-current. The photo-current at the output terminal is inversely proportional to the distance between the incident area and the output terminal. Thus, the potential level at the output terminal is representative of the distance between the incident area and the output terminal and, accordingly, the hammer position.

The hammer sensors 21d are connected to the data processor 22, and the data processor 22 periodically checks the interface assigned to the digital hammer position signals for the current hammer positions. A series of hammer positions is stored in the memory for each hammer 6 manipulated by the pianist. The data processor 22 analyzes each set of hammer positions for the trajectory, and extracts the pieces of music data information as similar to the data processor of the automatic player piano implementing the first embodiment. The data processor 22 produces a set of music data codes, and the playback system 3 reproduces the original performance.

The hammer sensors 21d cover the whole trajectories of the associated hammers 6. For this reason, the data acquisition system 2 achieves all the advantages of the present invention. In the fifth embodiment, physical quantity is the hammer position.

Sixth Embodiment

Figure 12:
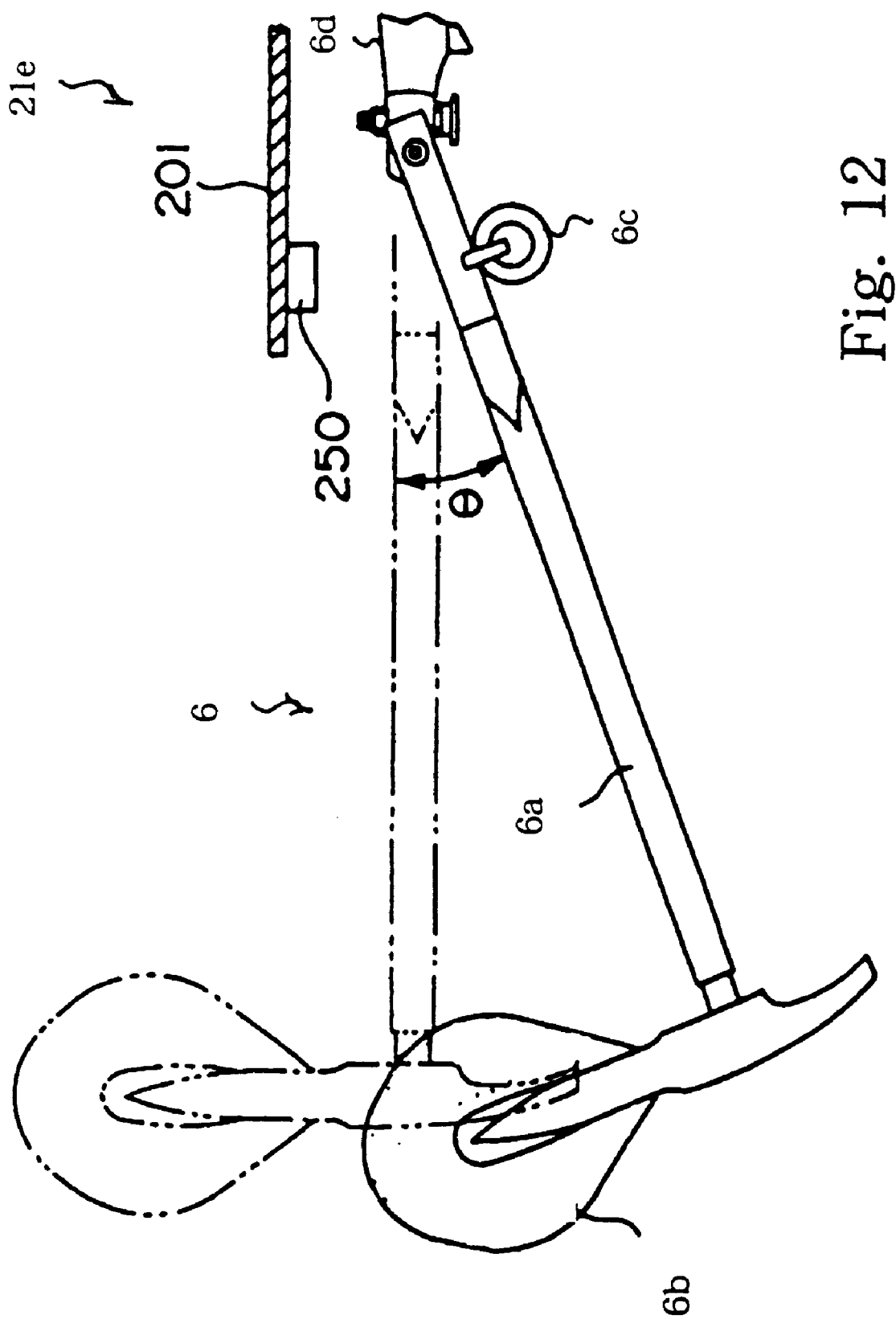
FIG. 12 is a side view showing a hammer sensor for monitoring a hammer incorporated in still another keyboard musical instrument according to the present invention.

FIG. 12 shows a hammer sensor 21e incorporated in still another automatic player piano embodying the present invention. The automatic player piano implementing the sixth embodiment is similar to the automatic player piano shown in FIG. 3 except the hammer sensors 21e. For this reason, other parts are labeled with the reference numerals designating the corresponding parts of the automatic player piano implementing the first embodiment without detailed description for the sake of simplicity.

The hammer sensors 21e monitor the associated hammers 6 over the whole trajectories between the rest positions and the rebounding points. All the hammer sensors 21e are similar to one another, and description is focused on one of the hammer sensors 21e shown in FIG. 12. The hammer sensor 21e is of the type detecting the angle θ. In this instance, an optical tilt sensor 250 is used for detecting the angle θ. The optical tilt sensor 250 radiates a light beam toward the hammer shank 6a, and the reflection returns to the optical tilt sensor 250. The reflection is deviated depending upon the angle θ. The optical tilt sensor 250 produces a hammer angle signal representative of the angle θ, and supplies the hammer angle signal to the data processor 22. The angle θ is varied together with the hammer position, and the data processor 22 determines the current hammer positions on the basis of the magnitude of the hammer angle signals.

The data processor 22 extracts the pieces of music data information as similar to the data processor 22 of the first embodiment, and the playback system 3 faithfully reproduces the original performance. The hammer sensors 21e cover the whole trajectories of the associated hammers 6. For this reason, the data acquisition system 2 achieves all the advantages of the present invention. In the sixth embodiment, the physical quantity is the hammer angle.

Seventh Embodiment

Figure 13:
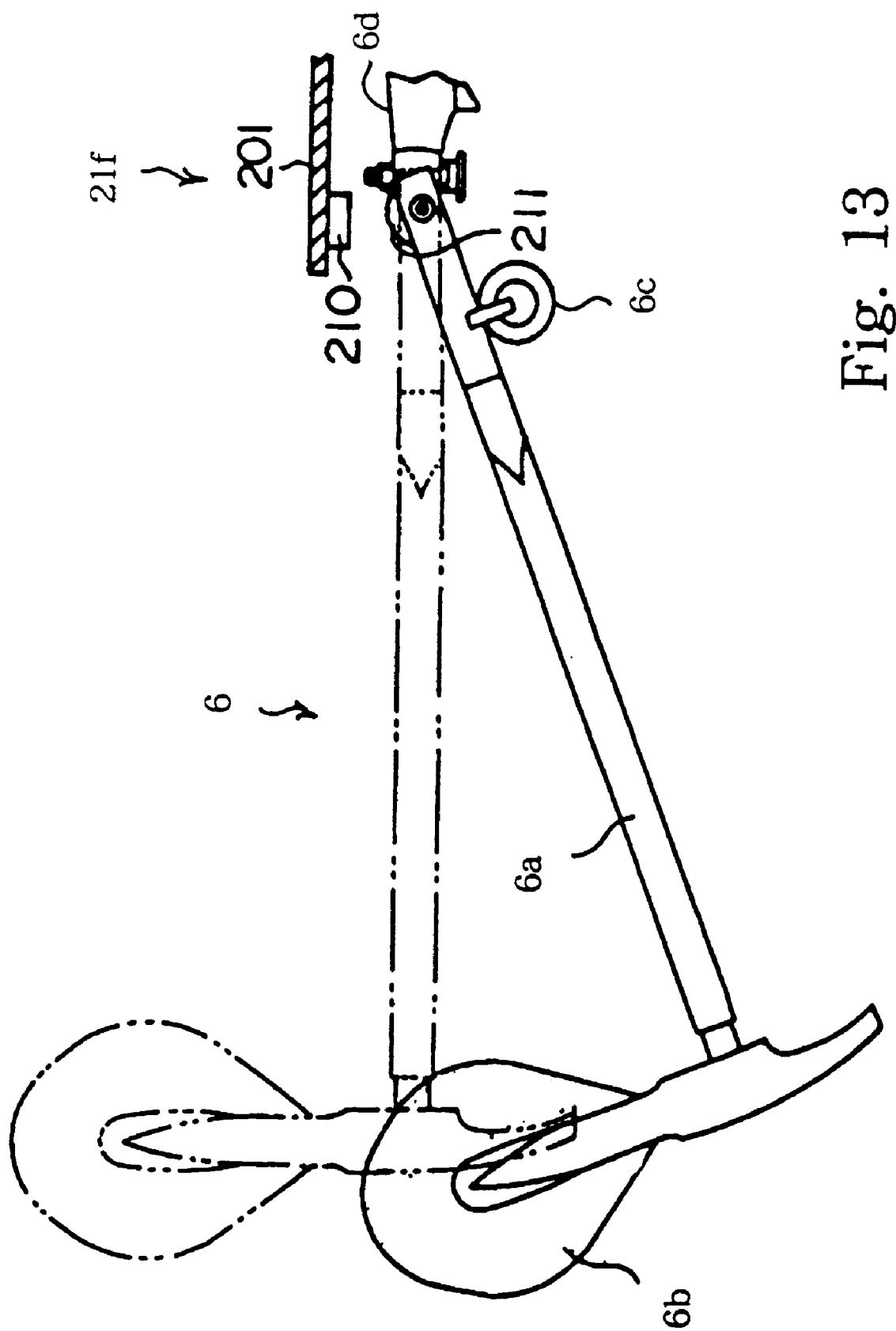
FIG. 13 is a side view showing a hammer sensor for monitoring a hammer incorporated in yet another keyboard musical instrument according to the present invention.

FIG. 13 shows a hammer sensor 21f incorporated in yet another automatic player piano embodying the present invention. The automatic player piano implementing the seventh embodiment is similar to the automatic player piano shown in FIG. 3 except the hammer sensors 21f. For this reason, other parts are labeled with the reference numerals designating the corresponding parts of the automatic player piano implementing the first embodiment without detailed description for the sake of simplicity.

The hammer sensors 21f monitor the associated hammers 6 over the whole trajectories between the rest positions and the rebounding points. All the hammer sensors 21f are similar to one another, and description is focused on one of the hammer sensors 21f shown in FIG. 13.

Figure 14:
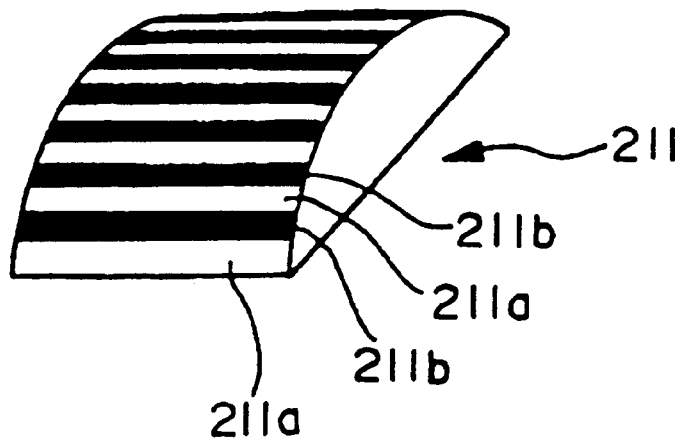
FIG. 14 is a perspective view showing a striped pattern of a photo-scale forming a part of the hammer sensor.
Figure 15:
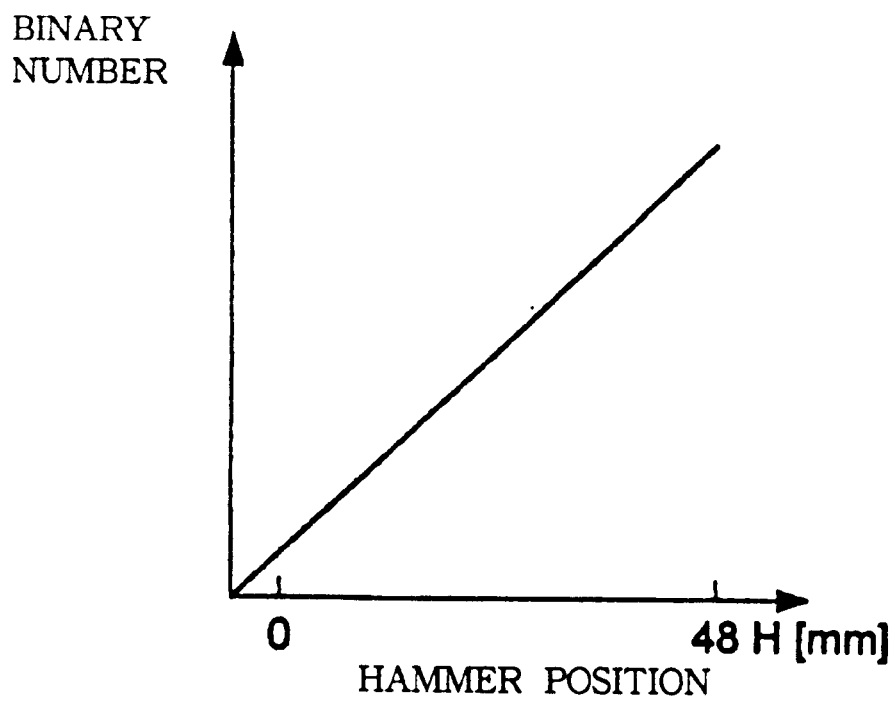
FIG. 15 is a graph showing a relation between a binary number and a hammer position.

The hammer sensor 21f is implemented by the combination of a photo-reflection pulse sensor 210 and a photo-scale 211. The photo-reflection pulse counter 210 is attached to a rigid board 201 laterally extending over the shank flange 6d, and the photo-scale 211 is attached to the boss portion of the hammer shank 6a. The photo-scale 211 has a striped pattern consisting of photo-reflecting stripes 211a and photo-absorbing stripes 211b (see FIG. 14), and the photo-reflecting stripes 211a are altered with the photo-absorbing stripes 211b. The photo-reflecting stripes 211a and the photo-absorbing stripes 211b may be formed on the outer surface of a semi-column shaped member through an evaporation technique and a patterning technique. A photo-coupler, a current-to-voltage converter and a suitable pulse counter may form in combination the photo-reflection pulse counter 210. In this instance, the photo-coupler radiates a light beam toward the photo-scale 211. While the hammer 6 is rotating, the light beam is alternately fallen onto the photo-reflecting stripes 211a and the photo-absorbing stripes 211b. The photo-reflecting stripes reflect the light beam toward the photo-coupler. However, the light beam is absorbed into the photo-absorbing stripes, and is not reflected. Thus, the photo-scale 211 intermittently reflects the light beam, and the reflection is incident on the photo-coupler. The photo-coupler converts the incident light to photo-current, and the current-to-voltage converter generates a pulse signal from the photo-current. The pulse signal is input to the pulse counter, and increments and decrements the binary number stored in the counter. The photo-reflecting stripe is corresponding to each pulse of the pulse signal. This means that the binary number is representative of the angle over which the hammer 6 is rotated. The angle is indicative of the hammer position. For this reason, the relation between the binary number and the hammer position is represented as shown in FIG. 15. The output signal of the photo-reflection pulse counter 210 is supplied to the data processor 22, and the data processor 22 extracts the pieces of music data information from a series of current hammer positions as similar to that of the first embodiment, and the playback system 3 faithfully reproduces the original performance. The hammer sensors 21f cover the whole trajectories of the associated hammers 6. For this reason, the data acquisition system 2 achieves all the advantages of the present invention. In the seventh embodiment, the physical quantity is the hammer position.

Eighth Embodiment

Figure 16:
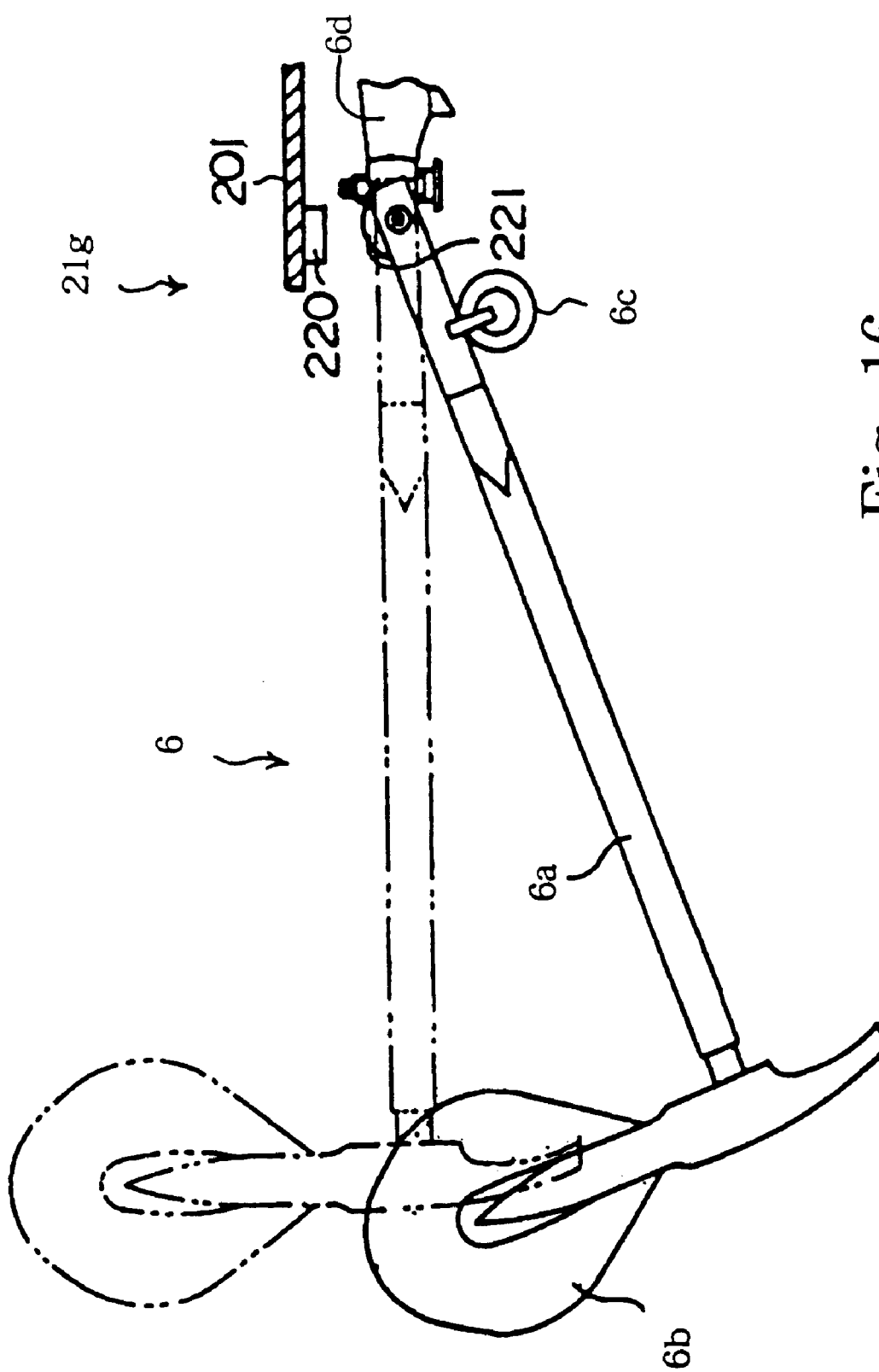
FIG. 16 is a side view showing a hammer sensor for monitoring a hammer incorporated in still another keyboard musical instrument according to the present invention.

FIG. 16 shows a hammer sensor 21g incorporated in still another automatic player piano embodying the present invention. The automatic player piano implementing the eighth embodiment is similar to the automatic player piano shown in FIG. 3 except the hammer sensors 21g. For this reason, other parts are labeled with the reference numerals designating the corresponding parts of the automatic player piano implementing the first embodiment without detailed description for the sake of simplicity.

The hammer sensors 21g monitor the associated hammers 6 over the whole trajectories between the rest positions and the rebounding points. All the hammer sensors 21g are similar to one another, and description is focused on one of the hammer sensors 21g shown in FIG. 16.

Figure 17:
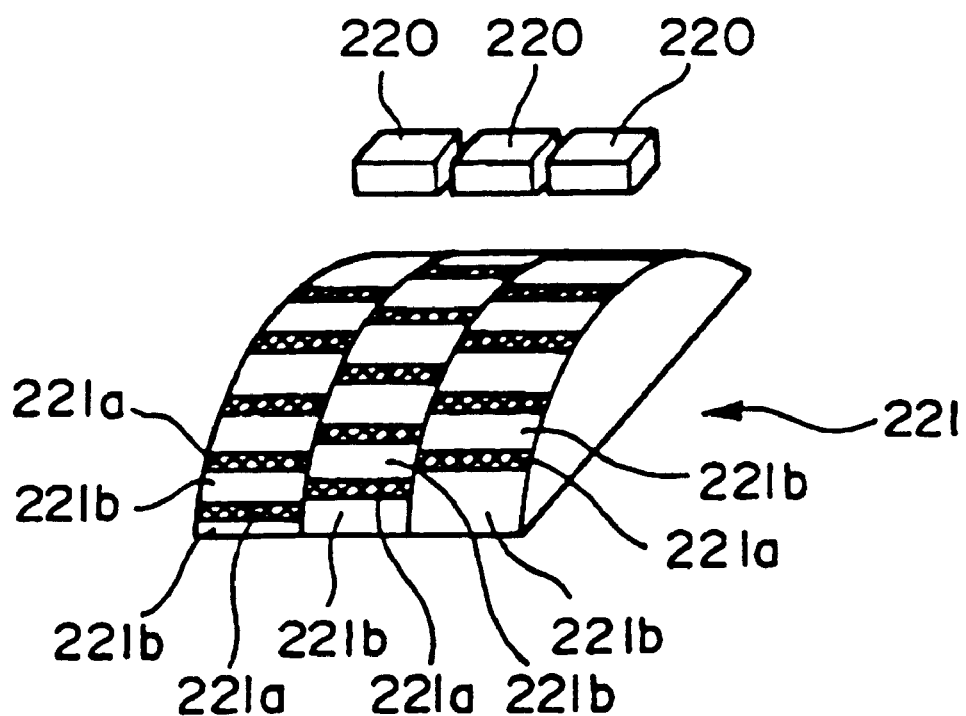
FIG. 17 is a perspective view showing a magnetic pattern formed on a scale forming a part of the hammer sensor.

The hammer sensor 21g is implemented by a set of magnetoresistance elements 220 and a magnetic scale 221. The set of magnetoresistance elements 220 is attached to a rigid board laterally extending over the shank flange 6d. On the other hand, the magnetic scale 221 has a magnetic pattern formed on the outer surface of a semi-column shaped body. The semi-column shaped body is attached to the boss portion of the hammer shank 6a. As will be better seen in FIG. 17, magnetized stripes 221a are altered with non-magnetized stripes 221b, and the magnetized stripes 221a and the non-magnetized stripes 221b form three columns on the outer surface of the semi-column shaped body. The three columns are opposed to the three magnetoresistance elements 220, respectively. The magnetized stripes 221a of the center column are slightly deviated from the magnetized stripes 221a of the right column, and the magnetized stripes 221a of the left column. While the magnetic scale 221 is being rotated together with the hammer 6, the magnetoresistance elements 220 generate pulse trains. The three pulse trains form an output pulse signal representative of the angle over which the hammer 6 is rotated. The angle is representative of the hammer position. Even if the rotation of hammer 6 is a little, at least one boundary between the magnetized stripe 221a and the non-magnetized stripe 221b passes the detectable zone under the associated magnetoresistance element 220, and the associated magnetoresistance element 220 generates the pulse. Thus, the three columns of magnetic pattern enhance the resolution.

The output pulse signal is supplied from each set of magnetoresistance elements 220 to the data processor 22, and the data processor 22 extracts the pieces of music data information from a series of current hammer positions as similar to that of the first embodiment, and the playback system 3 faithfully reproduces the original performance. The hammer sensors 21g cover the whole trajectories of the associated hammers 6. For this reason, the data acquisition system 2 achieves all the advantages of the present invention. In the seventh embodiment, the physical quantity is the hammer position.

Ninth Embodiment

Figures 18, 19:
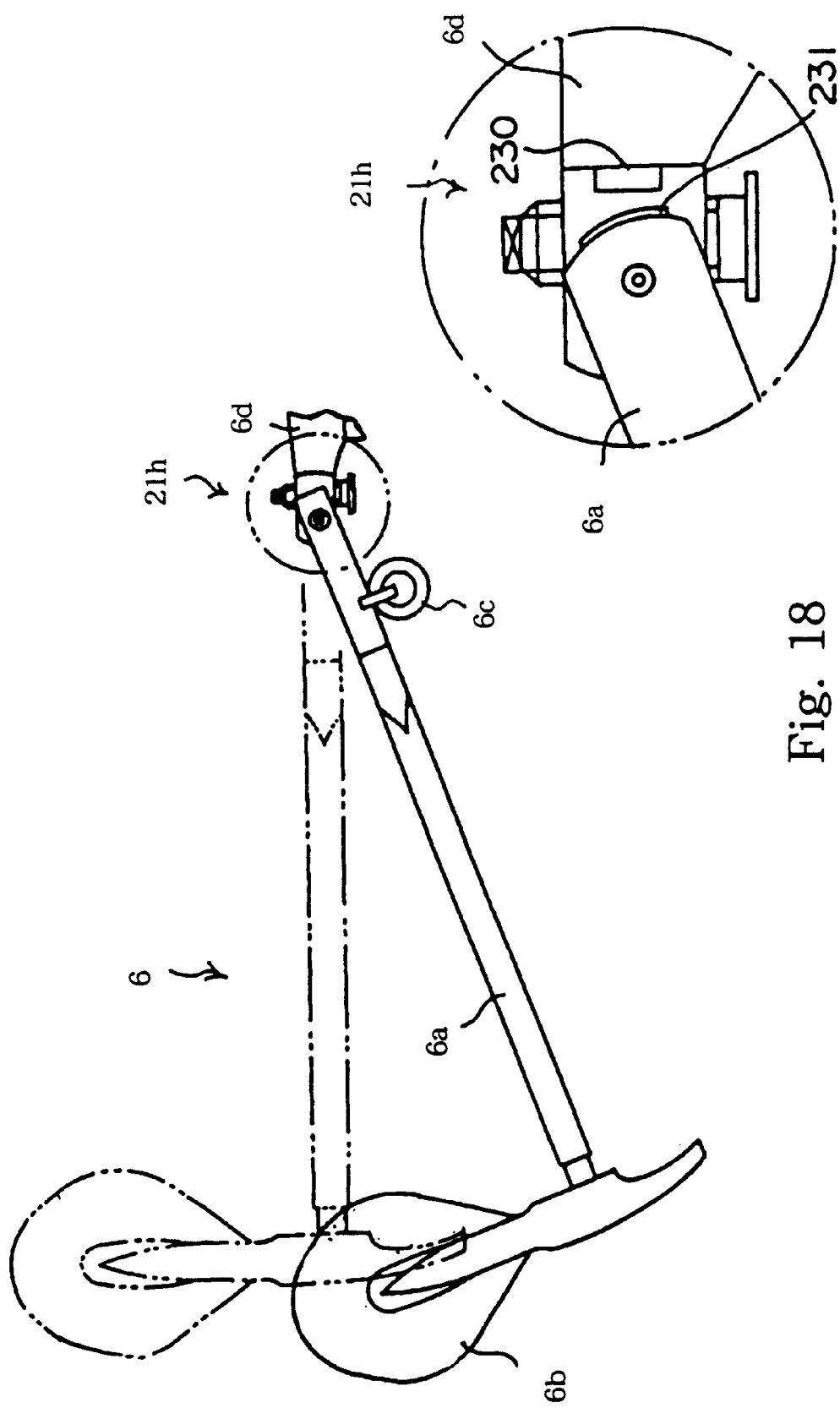
FIG. 18 is a side view showing a hammer sensor for monitoring a hammer incorporated in yet another keyboard musical instrument according to the present invention.
FIG. 19 is a partially cut-away side view showing a magnetic head built in a shank flange.

FIG. 18 shows a hammer sensor 21h incorporated in yet another automatic player piano embodying the present invention. The automatic player piano implementing the ninth embodiment is similar to the automatic player piano shown in FIG. 3 except the hammer sensors 21h. For this reason, other parts are labeled with the reference numerals designating the corresponding parts of the automatic player piano implementing the first embodiment without detailed description for the sake of simplicity.

The hammer sensors 21h monitor the associated hammers 6 over the whole trajectories between the rest positions and the rebounding points. All the hammer sensors 21h are similar to one another, and description is focused on one of the hammer sensors 21h shown in FIG. 18. The hammer sensor 21h is implemented by a magnetic head 230 and a magnetic scale 231. The magnetic scale 231 is attached to the bottom surface of the hammer shank 6a, and the magnetic head 230 is built in the shank flange 6d as shown in FIG. 19. The bottom surface is rounded so that the magnetic scale has the curved surface opposed to the magnetic head 230. The magnetic scale is magnetized in such a manner as to represent the distance from the rest position. While the hammer 6 is rotating around the shank flange 6d, the magnetic head 230 generates a hammer position signal representative of the distance.

The hammer position signal is supplied to the data processor 22, and the data processor 22 extracts the pieces of music data information from a series of current hammer positions as similar to that of the first embodiment, and the playback system 3 faithfully reproduces the original performance. The hammer sensors 21g cover the whole trajectories of the associated hammers 6. For this reason, the data acquisition system 2 achieves all the advantages of the present invention.

Tenth Embodiment

Figure 20:
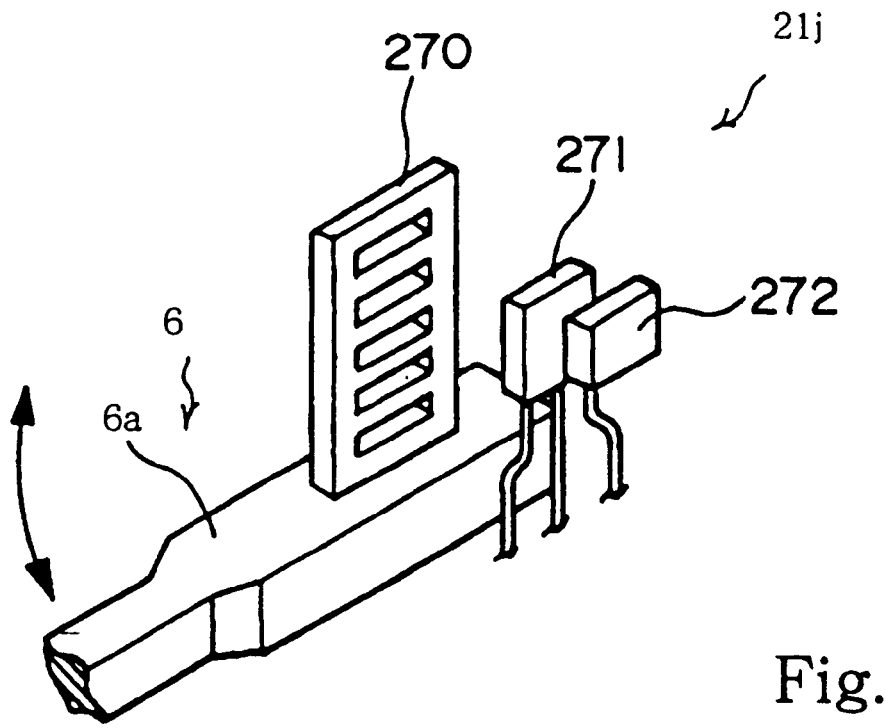
FIG. 20 is a side view showing a hammer sensor for monitoring a hammer incorporated in still another keyboard musical instrument according to the present invention.
Figure 21:
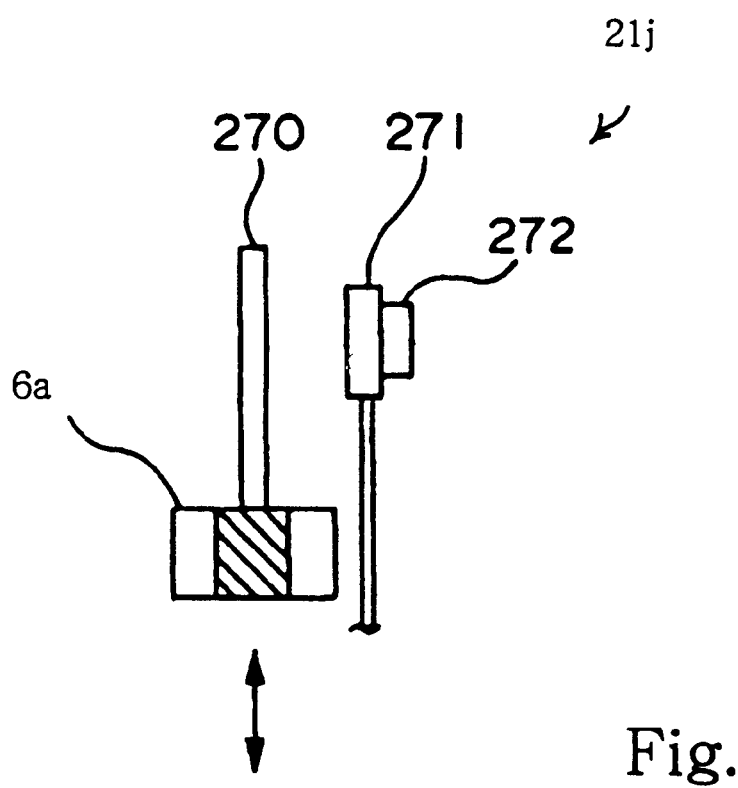
FIG. 21 is a front view showing the hammer sensor.

FIGS. 20 and 21 show a hammer sensor 21j incorporated in still another automatic player piano embodying the present invention. The automatic player piano implementing the tenth embodiment is similar to the automatic player piano shown in FIG. 3 except the hammer sensors 21j. For this reason, other parts are labeled with the reference numerals designating the corresponding parts of the automatic player piano implementing the first embodiment without detailed description for the sake of simplicity.

The hammer sensors 21j monitor the associated hammers 6 over the whole ranges between the rest positions and the rebounding points. All the hammer sensors 21j are similar to one another, and description is focused on one of the hammer sensors 21j shown in FIGS. 20 and 21.

The hammer sensor 21j is implemented by a combination of a magnetic plate 270, a Hall element 271 and a magnetic piece 272. The magnetic plate 270 is attached to the hammer shank 6a, and slits are formed in the magnetic plate 270 at intervals. The Hall element 271 is opposed to the magnetic plate 270, and the magnetic piece 272 is attached to the back surface of the Hall element 271. While the hammer 6 is rotating around the shank flange, the slits intermittently pass the detectable zone in front of the Hall element 271. The slits vary the magnetic circuit, and the Hall element 271 generates a pulse trail at the output terminal thereof. The pulse train is representative of the hammer position, and serves as a hammer position signal.

The hammer position signal is supplied to the data processor 22, and the data processor 22 extracts the pieces of music data information from a series of current hammer positions as similar to that of the first embodiment, and the playback system 3 faithfully reproduces the original performance. The hammer sensors 21g cover the whole trajectories of the associated hammers 6. For this reason, the data acquisition system 2 achieves all the advantages of the present invention.

The resolution of the hammer sensors shown in FIGS. 13 to 21 is high enough to extract the pieces of music data information from the series of hammer positions. The resolution may be of the order of ten microns per pulse.

Eleventh Embodiment

Figure 22:
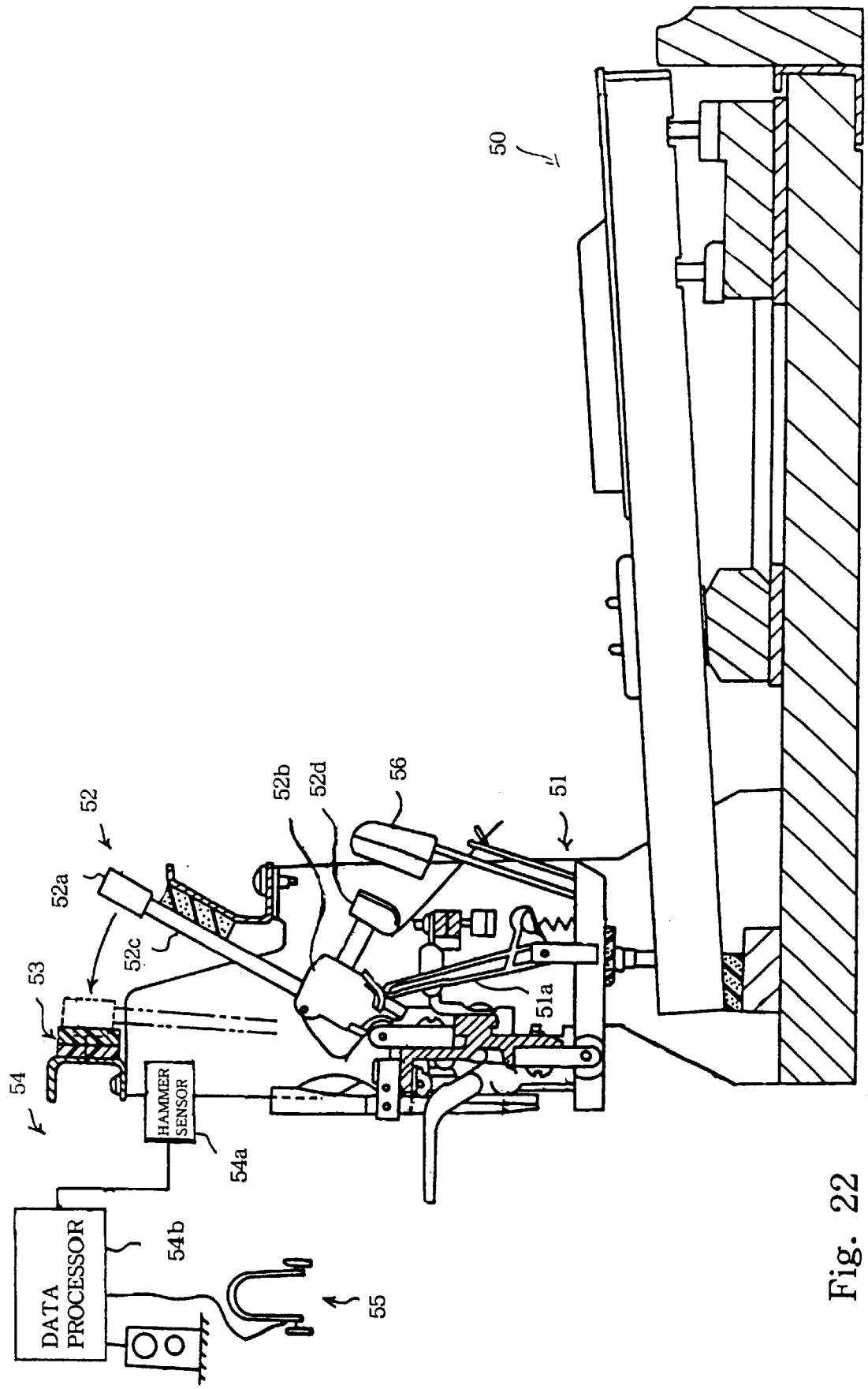
FIG. 22 is a side view showing the structure of a training keyboard musical instrument according to the present invention.

FIG. 22 shows a training keyboard musical instrument embodying the present invention. The training keyboard musical instrument comprises a keyboard 50, key action mechanisms 51, dummy hammers 52, a shock absorber 53, a data acquisition system 54 and a sound system 55. The keyboard 50 and the key action mechanisms 51 are similar to the keyboard and the key action mechanisms forming parts of a standard upright piano, and no further description is incorporated hereinbelow.

The hammers and the music strings of the upright piano are replaced with the dummy hammers 52 and the shock absorber 53, respectively. The dummy hammer 52 has a column shaped weight member 52a instead of the hammer head. The hammer butt 52b is connected through the hammer shank 52c to the column shaped weight member 52a, and a catcher 52d projects from the hammer butt 52b. The jack 51a escapes from the hammer butt 52b on the way from the rest position of the associated key to the end position, and the catcher 52d is gently received by a back check 56 after rebounding on the shock absorber 53. Thus, the key action mechanism 51 and the dummy hammer 52 give the unique piano key touch to the trainee. However, the dummy hammer 52 strikes the shock absorber 53, and rebounds thereon. The shock absorber 53 merely generates faint sound, and the trainee can silently practice the fingering on the keyboard.

The data acquisition system 54 is similar to that of the automatic player piano described hereinbefore, and includes hammer sensors 54a and a data processor 54b. Any kind of the hammer sensors 21, 21a to 21j is available for the data acquisition system 54. The hammer sensor 54a covers the whole range of the hammer motion, and supplies a hammer position signal to the data processor 54b. The data processor 54b extracts the pieces of music data information from a series of values representative of the physical quantity of the dummy hammer 52. The data processor 54b produces an audio signal from the music data codes, and supplies it to the sound system 55 for generating electronic sounds.

The hammer sensors 54a exactly determine the final hammer velocity, and the electronic sounds exactly reflect the force exerted on the keys.

In the eleventh embodiment, the dummy hammer and the shock absorber serve as at least one beating member/moving object and a beaten member, respectively.

As will be appreciated from the foregoing description, the data acquisition system according to the present invention has hammer sensors monitoring the hammers in the whole ranges between the rest positions and the associated music strings so as to exactly determine the trajectories of the hammers. The trajectories are so accurate that the data processor can extract the pieces of music data information from the trajectories for faithfully reproducing the original performance. Even though the relative position between the hammer sensors and the music strings are varied due to, for example, the deformation of the frame, the pieces of music data information are free from the variation, because the data processor determines the pieces of music data information at the predetermined sections or predetermined points on the actual trajectories.

Any additional part is not attached to the hammer shank 6a of the embodiments shown in FIGS. 4, 12 and 18. The moment to be required for the rotation of the hammer 6 is equal to the moment to be required for the rotation of a corresponding hammer incorporated in a standard grand piano. This results in that the pianist feels the key touch unchanged.

Although the magnetic sheet 204, the sensor body 206, the reflecting sheet 242, the photo-scale 211 and the magnetic scale 221 are adhered or attached to the hammer shanks 6a of the embodiments shown in FIGS. 7, 8, 9, 10, 13 and 16, these parts are located as close to the shank flanges 6d as possible, and the influence on the moment is little. Moreover, the magnetic sheet 204 and the reflecting sheet 242 are very light. For this reason, a pianist feels the key touch unchanged.

A part of the hammer sensor such as the magnetic sheet, the sensor body, the reflecting sheet, the photo-scale or the magnetic scale is attached to the hammer shank. The part of the hammer sensor is closer to the shank flange than the hammer head, i.e., on a half of the hammer shank closer to the shank flange, and is quite light. Therefore, the part of the hammer sensor is less influential on the key touch. In the case where the hammer sensor is associated with the hammer of a grand piano, the part of the hammer sensor is closer to the shank flange than the hammer roller. When the jack is brought into contact with the regulating button, the jack escapes from the hammer, and kicks the hammer roller. Even though the part of the hammer sensor is attached to the hammer shank, the influence of the part is negligible.

Although particular embodiments of the present invention have been shown and described, it will be apparent to those skilled in the art that various changes and modifications may be made without departing from the spirit and scope of the present invention.

For example, the relation between the time $\Delta t$ and the hammer velocity may be directly stored in the memory of the data processor 22. In this instance, when the final hammer velocity is calculated, the time $\Delta t$ is immediately determined only through the subtraction of the time $\Delta t$ from the initiation time T1 and/or the time for finishing the hammer motion.

Another automatic player piano may be fabricated on the basis of an upright piano. The hammer sensors according to the present invention is installed in the upright piano. When a pianist repeatedly depresses a white/black key at irregular intervals seven times per second, the hammer can not follow the white/black key. In this instance, the data processor modifies the pieces of music data information for reproducing the repetition at regular intervals.

The data processor 22 may extract another pieces of music data information to be required for the reproduction of original performance such as, for example, acceleration and deceleration on the trajectory represented by a series of hammer positions.

The hammer sensor may detect plural kinds of physical quantity such as, for example, the hammer position and the hammer velocity. In this instance, the pieces of music data information are extracted from not only a series of hammer positions but also a series of values representative of the hammer velocity so as to select one of the two sets of pieces of music data information. In this instance, the accuracy is further enhanced.

The data processor may not extract all the pieces of music data information. If only the note-on timing, the note-off timing, the final hammer velocity, the key code and the lapse of time are required for reproduction of an original performance, the data processor determines parts of trajectory to be required for the selected pieces of music data information.

The data acquisition system may be incorporated in a silent piano disclosed in, for example, U.S. Pat. No. 5,374,775 and an automatic player piano equipped with the controlling means or the silent system.

The data acquisition system may be added to an acoustic piano singly or together with the playback system after delivery to user. In other words, an acoustic piano is retrofitted to a keyboard musical instrument according to the present invention.

What is claimed is:

1. A keyboard musical instrument comprising
a keyboard having at least one key manipulated by a player,
at least one beating member linked with said at least one key and moved between a rest position and an impact position when said at least one key is manipulated,
a beaten member struck with said at least one beating member at said impact position,
at least one sensor continuously monitoring said at least one beating member moved between said rest position and said impact position for producing an output signal representative of a physical quantity of said beating member in the range between said rest position and said impact position, and
an information generating system connected to said at least one sensor and generating pieces of data representative of a motion of said at least one beating member on the basis of said output signal.

2. The keyboard musical instrument as set forth in claim 1, in which said output signal is an analog signal having a magnitude varied together with said physical quantity.

3. The keyboard musical instrument as set forth in claim 2, in which said physical quantity is a position of said at least one beating member with respect to a reference position.

4. The keyboard musical instrument as set forth in claim 3, in which said position is detected by said at least one sensor having an optical device radiating a light beam to said at least one beating member for converting a reflection on said at least one beating member to said output signal.

5. The keyboard musical instrument as set forth in claim 4, in which said optical device has a light emitting element radiating said light beam and a light detecting element for converting said reflection to an electric signal serving as said output signal.

6. The keyboard musical instrument as set forth in claim 4, in which said optical device has a light emitting element radiating said light beam and a position sending element having a photo-electric converting region elongated in a direction in which an incident spot of said reflection is varied.

7. The keyboard musical instrument as set forth in claim 3, in which said position is detected by said at least one sensor having a magneto-electric converter for producing said output signal and a piece of magnet attached to said at least one beating member.

8. The keyboard musical instrument as set forth in claim 7, in which said magneto-electric converter is a Hall element.

9. The keyboard musical instrument as set forth in claim 2, in which said physical quantity is an angle over which said at least one beating member is rotated.

10. The keyboard musical instrument as set forth in claim 9, in which said angle is detected by said at least one sensor of the type converting a photo reflection from said at least one beating member to a magnitude of an electric signal serving as said output signal.

11. The keyboard musical instrument as set forth in claim 2, in which said physical quantity is a velocity of said at least one beating member.

12. The keyboard musical instrument as set forth in claim 11, in which said velocity is detected by said at least one sensor of the type producing said output signal through an electromagnetic induction.

13. The keyboard musical instrument as set forth in claim 12, in which said at least one sensor has a coil and a magnetic piece attached to said at least one beating member and moved with respect to said coil.

14. The keyboard musical instrument as set forth in claim 2, in which said physical quantity is an acceleration of said at least one beating member.

15. The keyboard musical instrument as set forth in claim 14, in which said acceleration is detected by said at least one sensor of the type varying an electric current depending upon said acceleration.

16. The keyboard musical instrument as set forth in claim 1, in which said output signal is a digital signal representative of a binary number proportional to said physical quantity.

17. The keyboard musical instrument as set forth in claim 16, in which said physical quantity is a position of said at least one beating member with respect to a reference position.

18. The keyboard musical instrument as set forth in claim 17, in which said position is detected by said at least one sensor of the type having an optical scale attached to said at least one beating member for intermittently reflecting a light beam during rotation of said at least one beating member and a counting device for counting an optical pulse produced from said light beam.

19. The keyboard musical instrument as set forth in claim 17, in which said position is detected by said at least one sensor of the type having a magnetic scale with magnetized regions altered with non-magnetized regions and a counter for counting the magnetized regions passing in a detecting zone thereof.

20. The keyboard musical instrument as set forth in claim 19, in which said counter has a magneto-resistance element for producing an electric pulse train.

21. The keyboard musical instrument as set forth in claim 19, in which said counter has a magnetic head.

22. The keyboard musical instrument as set forth in claim 19, in which said counter has a Hall element.

23. The keyboard musical instrument as set forth in claim 19, in which said magnetized regions and said non-magnetized regions are arranged in plural columns in such a manner the magnetized regions of each of said plural columns are deviated from the magnetized regions of the other of said columns.

24. The keyboard musical instrument as set forth in claim 1, in which said at least one beating member and said beaten member are one of hammers mechanically linked with said at least one key and a music string, respectively.

25. The keyboard musical instrument as set forth in claim 24, further comprising action mechanisms linked between said keyboard and said hammers for independently driving said hammers for rotation when a player selectively depresses the keys of said keyboard.

26. The keyboard musical instrument as set forth in claim 25, further comprising a playback system having key actuators respectively associated with said keys and a controller for selectively actuating said key actuators.

27. The keyboard musical instrument as set forth in claim 1, in which said at least one beating member and said beaten member are a dummy hammer linked with said at least one key and a shock absorber.

28. The keyboard musical instrument as set forth in claim 27, further comprising action mechanisms linked between said keyboard and the dummy hammers for independently driving said hammers for rotation when a player selectively depresses the keys of said keyboard.

29. A data acquisition system for a moving object comprising at least one sensor monitoring said moving object in a whole range of motion thereof for producing a first output signal representative of a continuous variation of a physical quantity of said moving object, and a data processing system connected to said at least one sensor and extracting pieces of data information from said variation of said physical quantity for producing a second output signal representative of a meaning of said motion.

30. The data acquisition system as set forth in claim 29, in which said moving object is a hammer for striking a music string, and said hammer and said music string form parts of an acoustic piano together with an action mechanism and a damper mechanism.

31. The data acquisition system as set forth in claim 30, in which said music data information contains a first piece representative of a time for striking said music string with said hammer and a second piece representative of a hammer velocity immediately before striking said music string with said hammer.

32. The data acquisition system as set forth in claim 31, in which said music data information further contains a third piece representative of a time when said damper of said acoustic piano is brought into contact with said music string.

33. The data acquisition system as set forth in claim 31, in which said data processing system estimates a time for depressing a key linked with said hammer through an action mechanism on the basis of said hammer velocity and a virtual traveling path assumed to be continued to a trajectory of said hammer.

34. The data acquisition system as set forth in claim 30, in which said pieces of music data information is representative of an initiation time for rotation of said hammer, an impact time for striking said music string with said hammer, a final hammer velocity immediately before said impact time, an initiation time for downward motion of said key, a time for catching said hammer with a back check, a time for releasing said hammer from said back check, a hammer velocity after leaving said back check, a time for pressing said damper against said music string, a time for finishing a hammer motion at an end position thereof and a time for finishing a key motion at an end position thereof.

* * * * *